(12) United States Patent
Yao et al.

(10) Patent No.: US 10,380,414 B2
(45) Date of Patent: Aug. 13, 2019

(54) METHOD AND SYSTEM OF FACIAL EXPRESSION RECOGNITION USING LINEAR RELATIONSHIPS WITHIN LANDMARK SUBSETS

(71) Applicant: Intel Corporation, Santa Clara, CA (US)

(72) Inventors: Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 15/512,503

(22) PCT Filed: Oct. 23, 2014

(86) PCT No.: PCT/CN2014/089265
§ 371 (c)(1),
(2) Date: Mar. 17, 2017

(87) PCT Pub. No.: WO2016/061780
PCT Pub. Date: Apr. 28, 2016

(65) Prior Publication Data
US 2017/0286759 A1 Oct. 5, 2017

(51) Int. Cl.
*G06K 9/00* (2006.01)
*G06K 9/46* (2006.01)
*G06K 9/62* (2006.01)

(52) U.S. Cl.
CPC ..... *G06K 9/00308* (2013.01); *G06K 9/00241* (2013.01); *G06K 9/00281* (2013.01); *G06K 9/00315* (2013.01); *G06K 9/4638* (2013.01); *G06K 9/6234* (2013.01)

(58) Field of Classification Search
CPC ........... G06K 9/00315; G06K 9/00281; G06K 9/00241; G06K 9/00308; G06K 9/4638; G06K 9/6234
USPC ................................................. 382/118, 224
See application file for complete search history.

(56) References Cited

U.S. PATENT DOCUMENTS

2003/0133599 A1* 7/2003 Tian ................... G06K 9/00308
382/118
2014/0147022 A1 5/2014 Zhou et al.

FOREIGN PATENT DOCUMENTS

CN 102271241 12/2011
EP 2720194 4/2014

OTHER PUBLICATIONS

International Search Report & Written Opinion dated Jun. 29, 2015 for PCT Patent Application No. PCT/CN14/89265.
Jain, S. et al., "Facial Expression Recognition with Temporal Modeling of Shapes", 2011 IEEE International Conference on Computer Vision Workshops (ICCV Workshops), Nov. 13, 2011, pp. 1642-1649, ISBN 978-1-0062-9.
Extended European Search Report for European Patent Application No. 14904441.4, dated May 30, 2018.

(Continued)

*Primary Examiner* — Daniel G Mariam
(74) *Attorney, Agent, or Firm* — Green, Howard & Mughal LLP.

(57) ABSTRACT

A system, article, and method to provide facial expression recognition using linear relationships within landmark subsets.

25 Claims, 12 Drawing Sheets

(56) References Cited

OTHER PUBLICATIONS

Lien, J et al., "Subtly different facial expression recognition and expression intensity estimation", Computer Vision and Pattern Recognition, 1998. Proceedings. 1998 IEEE Computer Society Conference on Santa Barbara, CA, USA Jun. 23-25, 1998, Los Alamitos, CA, USA,IEEE Comput. Soc, US, Jun. 23, 1998 (Jun. 23, 1998), pp. 853-859, XP010291616.
Jain, S et al., "Facial expression recognition with temporal modeling of shapes", Computer Vision Workshops (!CCV Workshops), 2011 IEEE International Conference on, IEEE, Nov. 6, 2011 (Nov. 6, 2011), pp. 1642-1649, XP032095443, DOI: 10.1109/ICCVW.2011. 6130446 ISBN: 978-1-4673-0062-9.
Tsalakanidou, F et al., "Real-time 2D+3D facial action and expression recognition", Pattern Recognition, Elsevier, GB, vol. 43, No. 5, May 2010 (May 2010), pp. 1763-1775, XP026892644, ISSN: 0031-3203, DOI: 10.1016/J.PATCOG.2009.12.009.
De La Torre, F. et al., "Facial Expression Analysis", 7th IEEE International Conference on Biometrics BTAS 2015, Arlington, Virginia; Guide to Visual Analysis of Humans: Looking at People, Springer, 2011.
Kanade, T. et al., "Comprehensive Database for Facial Expression Analysis", Proceedings of the Fourth IEEE International Conference on Automatic Face and Gesture Recognition (FG'00), pp. 484-490, Grenoble, France.
Lucey, P. et al., "The Extended Cohn-Kanade Dataset (CK+): A complete dataset for action unit and emotion-specified expression", 2010 IEEE Computer Society Conference on Computer Vision and Pattern Recognition Workshops (CVPRW), Jun. 13-18, 2010, 10.1109/CVPRW.2010.5543262.
Pantic, M. et al., "Web-Based Database for Facial Expression Analysis", Proceedings of IEEE Int'l Conf. Multimedia and Expo (ICME'05). Amsterdam, The Netherlands, pp. 317-321, Jul. 2005.
Shan, et al., "Facial expression recognition based on Local Binary Patterns: A comprehensive study", Image and Vision Computing vol. 27, Issue 6, May 4, 2009, pp. 803-816.
Tong, Y., "Facial Action Unit Recognition by Exploiting Their Dynamic and Semantic Relationships", IEEE Transactions on Pattern Analysis and Machine Intelligence, vol. 29, No. 10, Oct. 2007.
Valstar, M. et al., "Induced Disgust, Happiness and Surprise: an Addition to the MMI Facial Expression Database", Proceedings of Int'l Conf. Language Resources and Evaluation, Workshop on Emotion. Malta, pp. 65-70, May 2010.
Wang, Z. et al., "Capturing Complex Spatio-Temporal Relations among Facial Muscles for Facial Expression Recognition", 2013 IEEE Conference on Computer Vision and Pattern Recognition (CVPR), Jun. 23-28, 2013, 10.1109/CVPR.2013.439.
Youssif, A., "Automatic Facial Expression Recognition System Based on Geometric and Appearance Features", www.ccsenet.org/cis Computer and Information Science vol. 4, No. 2; Mar. 2011, Published by Canadian Center of Science and Education. pp. 115-124 (10 pages).
Zhong, L. et al., "Learning Active Facial Patches for Expression Analysis", IEEE Transaction on Cybernetics, vol. 45, No. 8, pp. 1499-1510, Aug. 2015, pp. 1-8.

\* cited by examiner

FIG. 9

FACIAL EXPRESSION LABELS: $y_1, y_2, \ldots, y_T$

HIDDEN STATES: $h_1, h_2, \ldots, h_i$

OBSERVATIONAL FEATURES: $x_1, x_2, \ldots, x_i$

METHOD AND SYSTEM OF FACIAL EXPRESSION RECOGNITION USING LINEAR RELATIONSHIPS WITHIN LANDMARK SUBSETS

CLAIM OF PRIORITY

This Application is a National Stage Entry of, and claims priority to, PCT Application No. PCT/CN2014/089265, filed on 23 Oct. 2014 and titled "METHOD AND SYSTEM OF FACIAL EXPRESSION RECOGNITION USING LINEAR RELATIONSHIPS WITHIN LANDMARK SUBSETS", which is incorporated by reference in its entirety for all purposes.

BACKGROUND

Facial expression recognition is a very important non-verbal way for people to properly communicate with each other. Automatic facial expression recognition has been developed so that computers and other devices can use this tool to interact effectively with people in order to anticipate the desires or needs of a person as well as to assist people to interact with each other through certain mediums. These systems are used in applications such as perceptual user interfaces, vehicle driving safety devices, access control systems, facial animation for gaming or avatar communication, telenursing or remote medical care, online learning and edutainment programs, and so forth.

Dynamic facial expression recognition aims to continuously identify facial expressions spontaneously exhibited in captured or live video sequences. Conventional facial expression recognition methods, however, are either insufficient to detect subtle differences in facial features or are too computationally expensive. Thus, more efficient, accurate facial expression recognition is desired.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 9 is a diagram of a discriminative model for facial expression recognition;

FIG. 10 is a confusion matrix on CK+ dataset to show the results of facial expression recognition;

FIG. 11 is a confusion matrix on MMI dataset to show the results of facial expression recognition;

DETAILED DESCRIPTION

Figure 1:
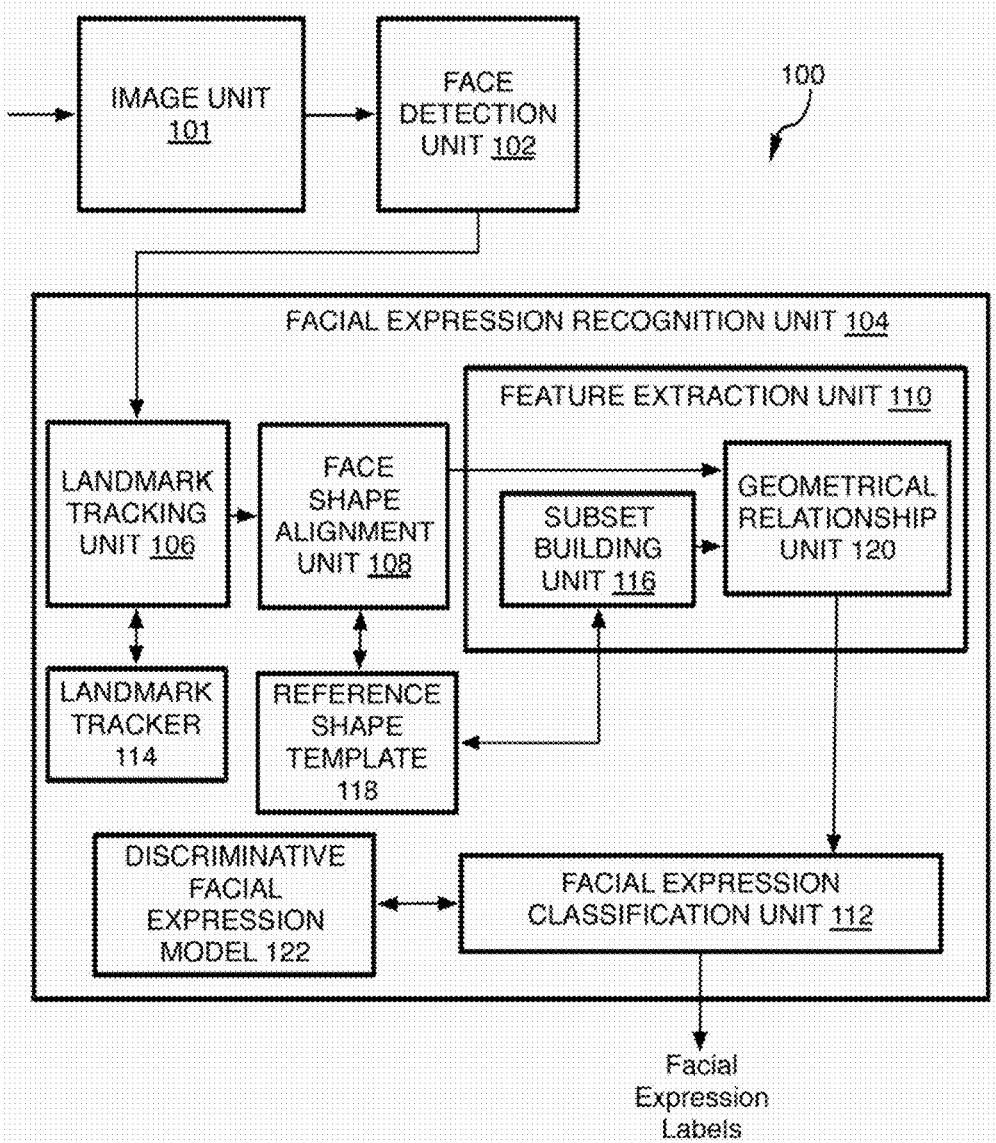
FIG. 1 is an illustration of an image processing device that performs facial expression recognition.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video cameras, video game panels or consoles, set top boxes, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, Articles, and Methods of Facial Expression Recognition Using Linear Relationships within Landmark Subsets.

As mentioned above, automatic facial expression recognition is desirable for better communication through computer implemented devices or to obtain more suitable reactions from an automated device with regard to a person's facial expression. These systems are used in applications such as perceptual user interfaces, vehicle driving safety devices, access control systems, facial animation for gaming or avatar communication, telenursing or remote medical care, online learning and edutainment programs, and so forth. Also as mentioned, the conventional dynamic facial expression recognition systems that aim to continuously identify facial expressions spontaneously exhibited in captured or live videos are still inadequate.

Specifically, conventional methods for facial expression recognition can be divided into two categories: (1) local feature based methods, and (2) action unit based methods. Local feature based methods primarily use local representative features such as Local Binary Pattern (LBP), Gabor, and Histograms of Oriented Gradients (HOG) to describe variations in appearance among different facial expression classes. These kinds of approaches are usually only well suited to identify easily recognizable, strong (or high magnitude) facial expressions on a face.

In contrast, Action Unit (AU) based methods are more popular and effective for handling continuous facial expression recognition problems in an ongoing video sequence. In this category, facial muscle movements are described in terms of the variations of a fixed number of unique AUs. More specifically, each AU has a certain spacing and arrangement of well-defined facial constituent components by a number of fiducial points, such as landmarks, hence it is related to one or more facial muscles. The movement of facial muscles from frame to frame in a video sequence can be described in terms of AUs. For example, in the well-known Facial Action Coding System (FACS), AU 10 depicts the raising of the upper lip, and so forth. Although this kind of approach has become the standard for dynamic facial expression representation and recognition, it is very difficult to be accurate with action unit detection in addition to its high computational cost.

To avoid these problems, powerful dynamic models have been developed that includes the improved invariants of Conditional Random Fields (CRFs) and Bayesian network, among others, to model temporal variations of face shape (i.e., a fixed number of semantically important facial landmarks). However, the capabilities of these dynamic models are partially restricted by the direct use of face shape data as the feature input for the model while neglecting the fact that face shape is usually neither dense nor discriminative. Thus, in the conventional form, the data of facial landmarks, such as 68 landmarks by one example, that are used directly to define a face shape does not provide a sufficient amount of data for describing complex facial expression variations with high accuracy since the data from the small number of landmarks or point locations are not sufficiently different among slightly or subtly different facial expressions.

To overcome these disadvantages, a fast, accurate, and dynamic facial expression recognition method disclosed herein uses a Dense Geometrical Relationship-Based Feature Descriptor (DGRBFD), and in some examples, a discriminative dynamic classification model such as a discriminative Latent Dynamic Conditional Random Fields (LDCRF) based dynamic model that uses the DGRBFD descriptor to identify a facial expression class for a face. Also, the disclosed dynamic facial expression method takes originally sparse geometric features at facial landmarks and boosts them to be denser and more discriminative by determining a geometric relationship, and in one case regressing a linear relationship, among a main landmark and a subset of the other landmarks on the face shape. By one form, the subset includes at least the nearby neighbor facial landmarks relative to the main landmark. The extracted relationships are used to form the DGRBFD descriptor for each face image. DGRBFD descriptors over training facial expression sequences (or temporal frames or time instants) are provided to learn a discriminative LDCRF based dynamic model which can jointly encode intrinsic sub-structures in each facial expression category and extrinsic transitions between different facial expression categories. The learned LDCRF model estimates a facial expression class label for each face in a current frame with the respective DGRBFD descriptor. The disclosed method also is able to perform facial expression recognition not only over multiple frames but also on a single frame. It can run with a very fast speed (>50 fps) on conventional computers mostly regardless of the resolution of a video frame. The size of the dynamic facial expression model may be less than 5 KB.

In more detail, in face detection and face expression recognition systems, a face shape is defined by a fixed set of landmarks where each single landmark is a semantically important data point that is related to a part of a facial component such as a mouth, nose, eye, jaw line, chin, and so forth. The data at the landmark may include whatever data is relevant to the analysis including geometric (or pixel) coordinates, luminance, color, and/or motion information that indicates a change from expression to expression (or frame to frame) in a video sequence of one or more faces. A change in facial expression often causes noticeable or very minor or subtle variations in physical geometric features of the face at landmarks located around the primary facial components. More importantly, it has been found that such geometric variation of facial features at one specific facial landmark is closely related to at least the nearby neighbor facial landmarks that cooperatively define the same facial component and/or a part or parts of close-by facial components. In some cases, all or almost all of the landmarks on a face may be geometrically related to a single landmark for a specific facial expression. Herein, the term "related" refers to a landmark that may be at a certain distance (or range) relative to other landmarks for a specific facial expression. Thus, extracting dense geometric feature relationships between multiple, or every facial landmark and a respective subset including nearby neighbor landmarks may be a more accurate and efficient way to describe facial expression variations, thereby avoiding complex action unit detection technologies. In this process, therefore, the data at each main landmark may be represented by those of a group or subset of landmarks rather than that at a single landmark. Also, this concept may be expanded so that each subset formed for a main landmark includes all (excluding the main landmark itself) or most of the other landmarks defining the face.

By one approach, a geometrical relationship is formed among the main landmark and its subset by formulating and solving a linear regression-type problem using the data at the main facial landmark and the landmarks in the subset. The linear regression may be used to capture dense and discriminative relationships between geometric features of (1) at least one or more facial landmarks (referred to as a main or anchor landmark whenever a subset of landmarks is assigned to the main landmark), and optionally, every landmark on a face may be a main landmark, and (2) other landmarks, such as nearby neighbor landmarks, or all other landmarks on the same face, forming a subset of landmarks for the main landmark. Another way to say this is that the process or system uses linear 1-to-K individual geometrical relationship values between geometric features of every facial landmark and a respective subset with other landmarks. Thus, for consistency and clarity, the over-arching concept of the main landmark and subset cooperatively forming a linear combination by performing linear regression for example, will be referred to herein as the geometrical relationship, while the individual relationships in the descriptor-vector with each individual landmark in the subset will be referred to as the geometrical relationship values.

A linear model is formed representing the geometric features at multiple or all main facial landmark as a linear combination of those of a respective subset of landmarks. By one example, the solution of this linear problem is solved with a least-square formula, and is used to form the DGRBFD descriptor. The DGRBFD descriptor, which can capture diverse facial expression variations due to the movements of facial muscles, is constructed by stacking and concatenating the solutions (the geometrical relationships) concerning multiple or every facial landmark and its subset. The geometrical relationships are concatenated in the same sequence (1 to N) as an index of the main landmarks established when the main landmarks were assigned their subsets, and as used to establish the geometrical relationship solutions. By one example approach, the geometrical relationship values of subset landmarks (1 to K) for each main landmark are also kept in order by the (1 to N) index number of the landmarks. Thus, for example, if main landmarks 1, 2, 21, and 26 are also in a subset for main landmark 5, the landmarks are concatenated in this numerical order, within the concatenation space for main landmark 5, when forming the descriptor for this face shape, and as explained in greater detail below with FIG. 7.

Using the DGRBFD descriptor to represent temporal facial expression samples, conventional individual classifiers of Support Vector Machine (SVM) or Multi-Layer Perceptron (MLP), and so forth, can be trained for a recognition task. More advanced classification uses a discriminative dynamic label model, and in one example the LDCRF based dynamic model, is further presented to jointly encode temporal facial expression variations including intrinsic substructures in each facial expression category and extrinsic transitions between different facial expression categories. With this process, the DGRBFD descriptor can be used to reliably depict noticeable or minor or subtle facial expression variations resulting from facial muscle movements in a dense and discriminative manner.

Referring to FIG. 1, an image processing device 100 used to perform facial expression recognition may have, or may be in communication with, an image unit 101 that receives or forms single images, such as for still photographs, or video sequences that include a number of sequential frames. Relevant here, the video sequence may have images with content that includes one or more faces and that have facial expressions that change over time, or as the video proceeds frame by frame. The image unit 101 may receive or form raw image data from an image capture device such as a camera or camera module for example, or may receive image data from a memory. The image unit 101 may output raw image data, pre-processed image data, or otherwise image data that has already been partially or completely processed, such as by an encoder, and may be ready for display or storage. The image data may be in the form of luminance and/or color values for pixels in the frames as well as other statistical data that may be used for face detection. The image data may then be provided to a face detection unit or face classifier 102 that detects any face instances in the pictures or frames of the image data. Some of the face detection techniques used may include Viola & Jones cascaded Adaboost approaches with Haar-like, LBP or HOG features. The output may be frame coordinates that define a rectangular bounding box around each face instance.

The image processing device 100 also may have a facial expression recognition system or unit 104 to determine the facial expression class for each detected face and at a single frame or over a sequence of frames. To accomplish this, the facial expression recognition unit 104 may have an automatic landmark tracking unit 106 that receives the image data and provides fast and accurate algorithms for detecting and tracking facial landmark positions as the positions change over the frames of the video sequence on the detected faces of the image data. This may include facial landmark detection (also referred to as initialization), tracking of facial landmarks from expression to expression and between changing face poses, and validation (i.e., failure identification and tracking reset). A landmark tracker 114 may be provided to store an offline learned face shape detector for detecting landmarks on faces, and the tracking algorithms. One such landmark tracking method uses online shape regression as disclosed by U.S. patent application Ser. No. 14/106,134. Other automatic landmark detection or tracking methods include Active Appearance Model (AAM), Constraint Local Model (CLM), Explicit Shape Regression (ESR), Supervised Descent Method (SDM), etc. The output of the landmark tracking unit 106 is the coordinates of the landmarks for each face in continuous frames, and in the case of the online shape regression method, 68 landmarks may be provided for each face although many different numbers of the landmarks may be available on a face depending on the system used.

A face shape alignment unit (also referred to as a similarity transformation unit) 108 receives the tracked face shape containing landmark coordinates to normalize the current face shape by using a reference face shape that is itself formed by using training samples, and stored as a reference shape template 118 for use to form an aligned (normalized) face shape. The reference face shape also is used by a feature extraction unit 110, and particularly by a subset building unit 116, to establish which landmarks (referred to as the main landmarks) is to be assigned a subset of other landmarks (and in some cases nearby neighbor landmarks), and which landmarks are included in each subset. The subset arrangement may be kept the same for all of the faces using the same reference face shape.

The feature extraction unit 110 also may have a geometrical relationship unit 120 that receives both the subset arrangement from the subset building unit 116 and aligned face shape from the face shape alignment unit 108. The geometrical relationship unit 120, for each main landmark, determines the relationship among the main landmark and its subset of landmarks, and by one example, using a linear regression problem that factors in the coordinates of each of the landmarks, and solves the problem using a least-squared method as provided in detail below to determine a geometrical relationship for each of the landmarks with a subset. The geometrical relationships are then combined as explained below to develop a DGRBFD descriptor for the face that includes the differences between the geometrical relationships on a current frame versus that on an onset frame, and that characterizes the current facial expression of the face.

The descriptor, including the combined geometrical relationships, is provided to a facial expression classification unit 112. This classification unit 112 may use a discriminative facial expression model 122, such as a CRF model, and by one form the discriminative LDCRF based dynamic model described below. The changes (or differences) in geometrical relationship as grouped into the descriptor are input into the model. The model may encode intrinsic sub-structures in each facial expression category as well as extrinsic transitions between different facial expression categories for performing recognition. The output of the model is a facial expression class label for each face and at each time (or in other words, for each frame or descriptor) being analyzed. Many other details for the image processing device 100 are explained below.

Figure 2:
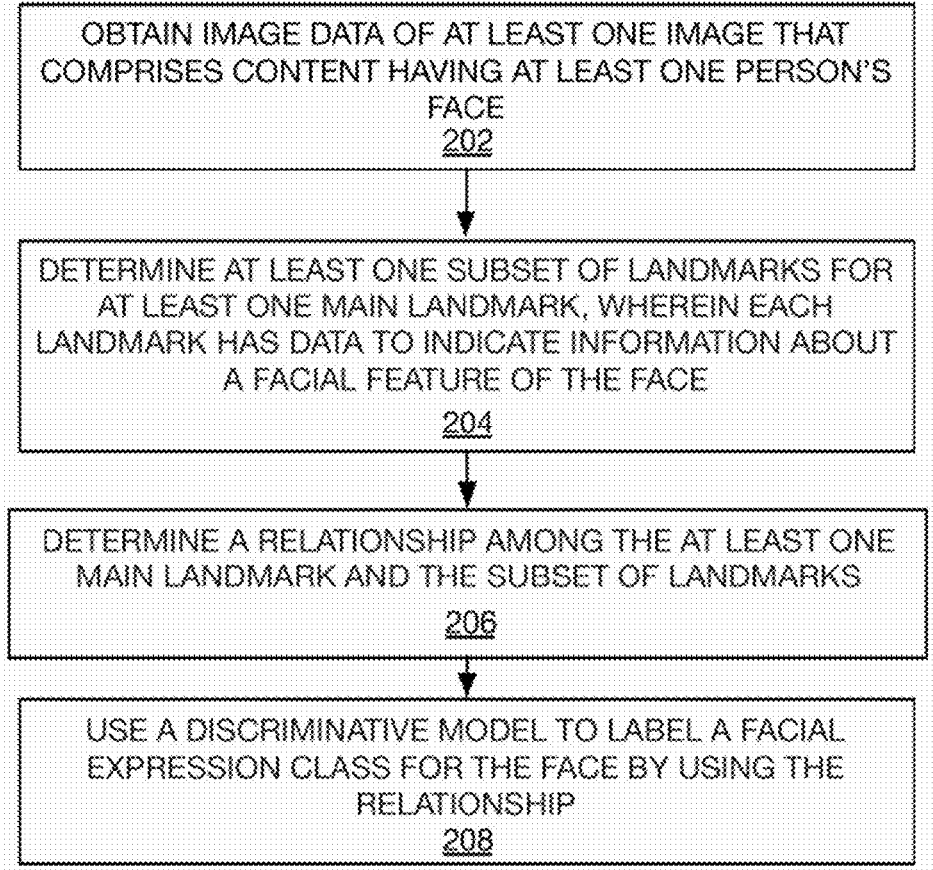
FIG. 2 is a flow chart showing a facial expression recognition process.

Referring now to FIG. 2, by one approach an example process 200 is a computer-implemented method of face expression recognition using landmark subsets. In the illustrated implementation, process 200 may include one or more operations, functions or actions as illustrated by one or more of operations 202 to 208 numbered evenly. By way of non-limiting example, process 200 may be described herein with reference to example image processing devices 100 and 1300 of FIGS. 1 and 13 respectively, and where relevant.

Process 200 may include "obtain image data of at least one image that comprises content having at least one person's face" 202. As mentioned herein, this could be a single image with a face, or multiple images along a video sequence of frames that shows changes in facial expression on the same face or faces as time passes.

Process 200 may include "determine at least one subset of landmarks for at least one main landmark, wherein each landmark has data to indicate information about a facial feature of the face" 204. This operation may include using landmarks detected on one or more faces and that indicate the position (or geometry) of the facial features on the face, and forming a subset of landmarks associated with a main landmark. As explained in greater detail below, all or less than all landmarks may be a main landmark with a subset, and the subset may include nearby neighbor landmarks, all other landmarks, and/or a certain number of closest (by distance) landmarks. The subsets may be set the same for multiple or all frames as explained below.

Process 200 may include "determine a relationship among the at least one main landmark and the subset of landmarks" 206. By one approach, this refers to a geometrical relationship, such as determined by linear regression. While this operation covers the case where only one subset is formed, normally multiple subsets will be formed. Thus, when multiple subsets are set for multiple respective main landmarks, each main landmark and corresponding subset has a geometrical relationship. The geometrical relationship may be a vector of geometrical relationship values each corresponding to one of the landmarks in the subset. The geometrical relationships may be combined, by one example by stacking and concatenating in sequence, into a descriptor that includes changes in geometrical relationships over time (from a start or onset frame with the face to the current frame). The number of geometrical relationships (and in turn, geometrical relationship values) in the descriptor may then be reduced by primary component analysis (PCA). The details are explained below.

Process 200 may include "use a discriminative model to label a facial expression class for the face by using the relationship" 208. Again, while the operation covers the case of a single relationship, normally multiple relationships (for example, multiple geometrical relationships with one such relationship for each subset) will be formed, and the one or more relationships will be used to form a single descriptor for the face. Here, the descriptors, and in turn the temporal differences of the geometrical relationships may be the input into a conditional random field model, and by one example, a latent (e.g. having hidden values) dynamic conditional random field (LDCRF) model. As mentioned herein the model considers both intrinsic sub-structures by associating a set of intermediate hidden states to each facial expression category and by using the subsets, and extrinsic transitions by modeling a continuous stream of facial expressions by using temporal sequences of descriptors. The model then provides each facial expression sample an estimated class label. Many more details are provided below.

Figure 3:
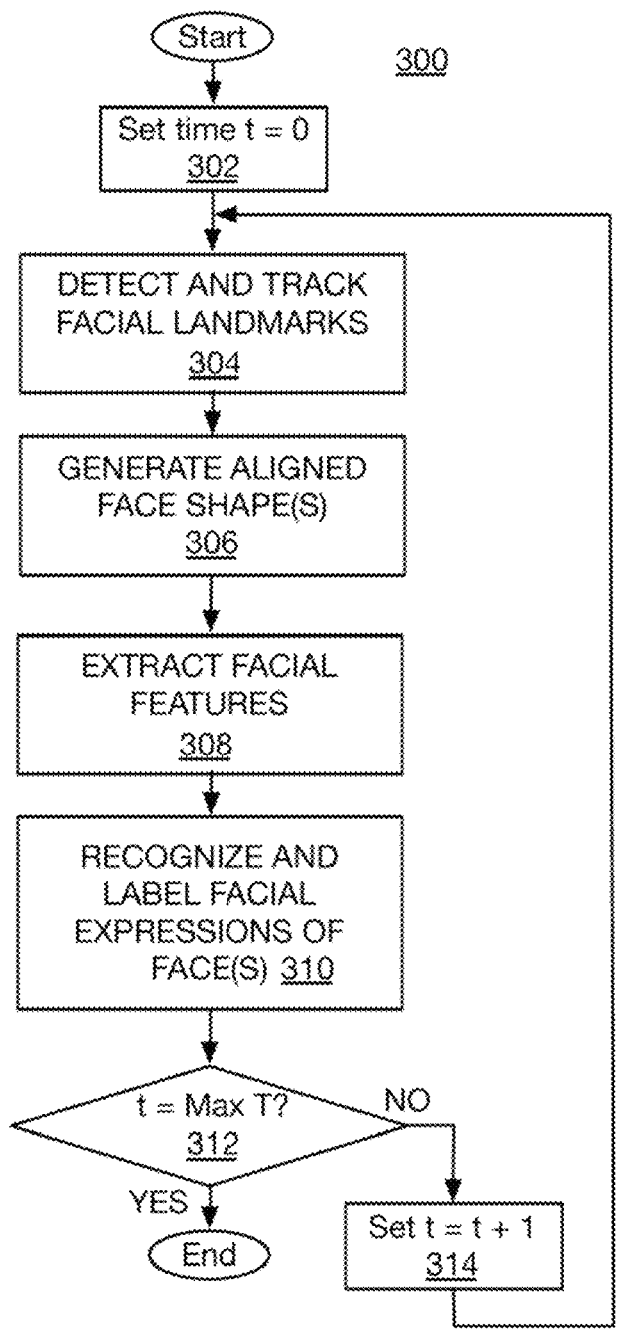
FIG. 3 is a detailed flow chart of a facial expression recognition process.

Referring now to FIG. 3, by one approach an example process 300 is a computer-implemented method of facial expression recognition using landmark subsets. In the illustrated implementation, process 300 may include one or more operations, functions or actions as illustrated by one or more of operations 302 to 312 numbered evenly. By way of non-limiting example, process 300 may be described herein with reference to example image processing devices 100 and 1300 of FIGS. 1 and 13 respectively, and where relevant.

Process 300 may include "set time t=0" 302 when a video sequence of frames or images that have content that includes at least one face. The initial or onset frame at t=0 is analyzed first as described in detail below. It will be understood that the process 300 presented herein may be performed frame by frame such that each frame or image defines a specific instant or time t.

Figure 5:
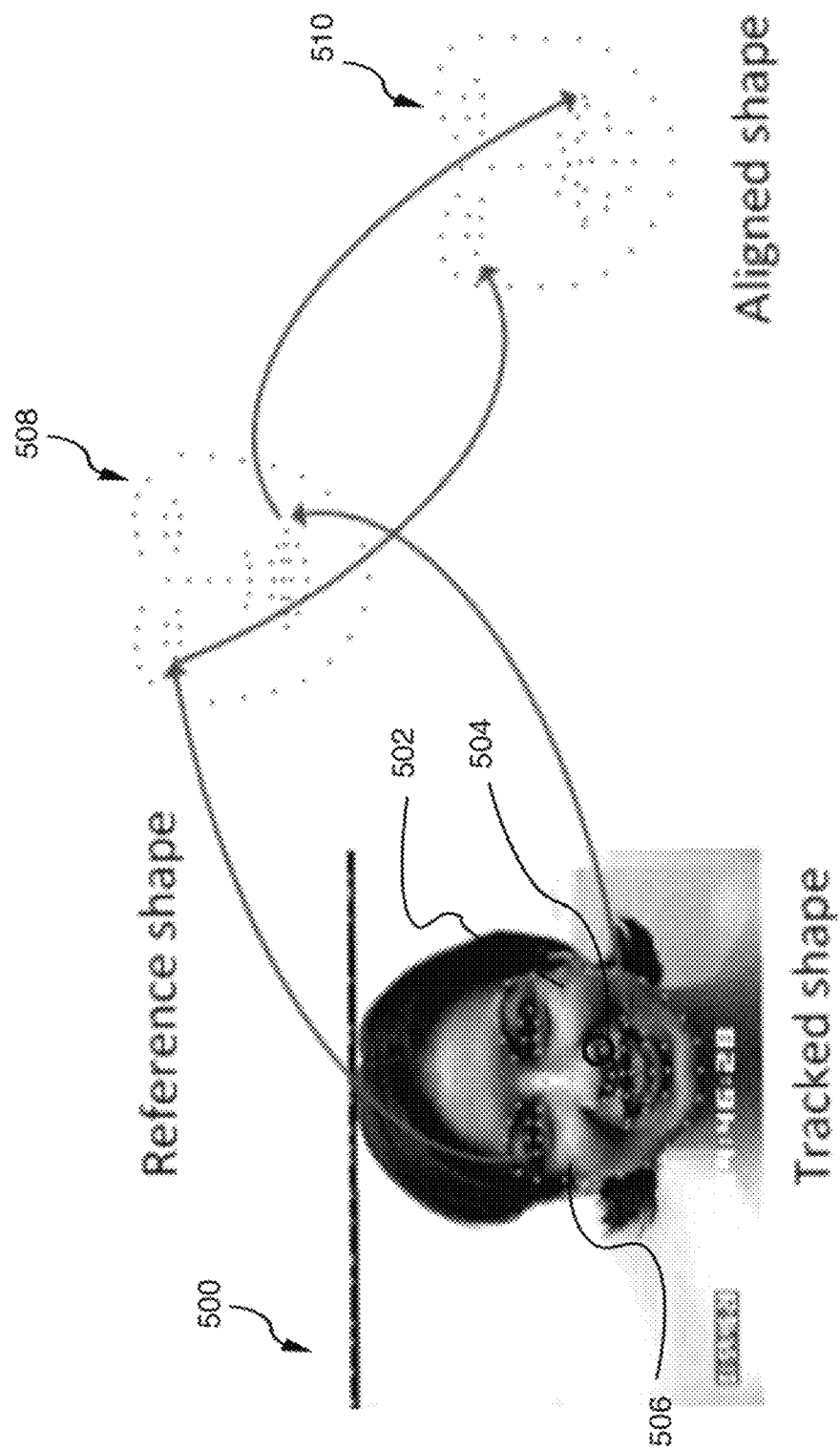
FIG. 5 is a diagram to explain face shape alignment for facial expression recognition.

Referring to FIG. 5, process 300 may include "detect and track facial landmarks" 304. This operation may include the automatic detection of landmarks on a face that has already been detected on a frame. By one example used herein, there are 68 landmarks for each face. An example image or frame 500 shows a face 502 with landmarks 504. As shown, the landmarks may indicate the jaw line, eyebrows, outline of the eyes, bridge and end of the nose, and the outline of the lips by one example, although many other possibilities exist.

As mentioned above, one set of fast and effective algorithms for facial landmark detection (initialization), tracking, and validation (i.e., failure identification and tracking reset) may be provided by an online shape regression system disclosed by U.S. patent application Ser. No. 14/106,134, filed Dec. 13, 2013. This system provides very accurate tracking performance under changing facial expressions and face poses, but also runs with an extraordinarily fast speed (over 500 fps) and a small memory usage (less than 5 MB). The trained model is capable of tracking 68 facial landmarks. Other alternative systems are mentioned above. The outputs are the frame coordinates for each landmark, and at each frame when the landmarks are being tracked along the frames.

Process 300 also may include "generate aligned face shape(s)" 306. This operation performs similarity transformation based alignment. Specifically, once facial landmark positions in the current image are reliably tracked, the original face shape including all facial landmarks is normalized so as to remove the effect of 2D in-plane face transformation (translation, scaling, and rotation) that may have been performed for landmark detection and tracking or is otherwise inadvertent. The normalization also may remove minor 3D out-of-plane face motion. This is performed while keeping variations resulting from facial expression changes in a face over time. As a result, facial features can be geometrically normalized. Herein, conventional similarity transformation based alignment may be used that registers each tracked face shape 506 to a reference face shape 508 computed as the average of all training samples in order to build an aligned face shape (also referred to as a normalized face shape) 510. This may include backward mapping and piece-wise affine warping by one example. As a result, the landmarks on the reference face shape usually may have different coordinate positions than on the aligned face shape.

Process 300 may then include "extract facial features" 308. In this operation, as explained in detail below with process 400 (FIG. 4), this is performed by forming dense areas of geometrical relationship values among landmarks and using a number of these areas (or facial landmark subsets) to determine a facial expression for the face. A geometrical relationship, as a vector of geometrical relationship values, may be determined for each dense area, and then combined in a dense geometrical relationship-based feature descriptor (DGRBFD). The geometrical relationships are combined by concatenating and stacking temporal differences for each of the geometrical relationship values. Then, the descriptors for each frame (or in turn geometrical relationship) may be provided to a model to determine which facial expression category is suggested by each descriptor.

Process 300 may include "recognize and label facial expressions of face(s)" 310. This operation, also provided in greater detail in process 400, may include inputting the DGRBFD descriptors into the LDCRF model mentioned herein. Particularly, the model may include parameters learned from all of the descriptors over training video sequences being analyzed as explained in detail below. By one approach, the different facial expression classes may include happy, sadness, contempt, anger, disgust, fear, and surprise. Other or different combinations of facial expressions are possible. The output will be a facial expression class label for each face on the current frame.

Process 300 may then have a test 312 to determine whether a max time T (or max. frame) has been reached in a video sequence and that has a face that is to be analyzed. If not, t is increased by one (314), and the process loops again for the next frame at the new time t. If so, and the video sequence analysis is complete, the process ends, and the end-use applications may use facial expression recognition to perform other tasks.

Figure 4:
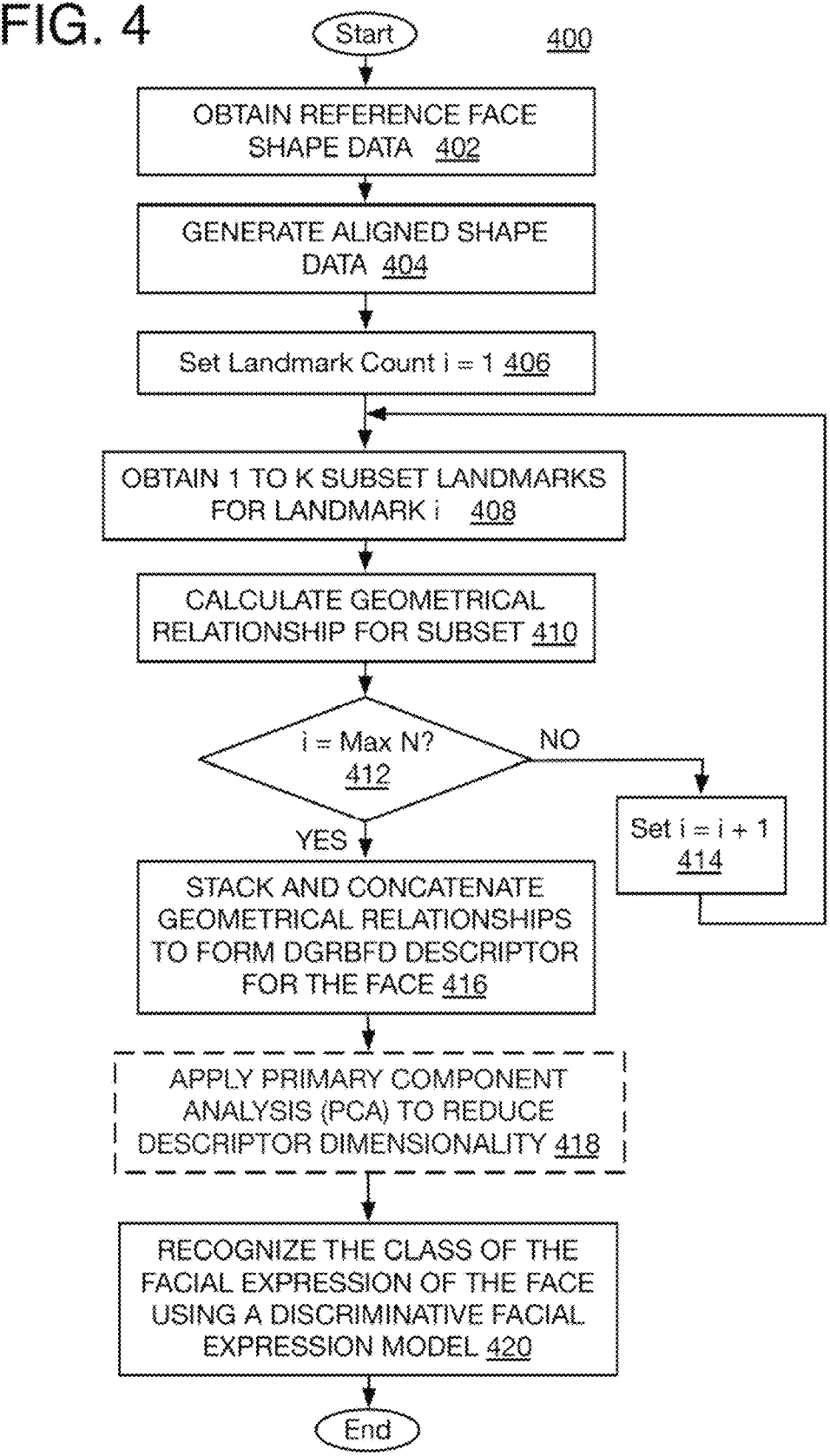
FIG. 4 is a detailed flow chart of a portion of a facial expression recognition process.

Referring now to FIG. 4, by one approach an example process 400 is a computer-implemented method of facial expression recognition using geometrical relationships, such as linear relationships, within landmark subsets, and particularly related to feature extraction and facial expression classification. In the illustrated implementation, process 400 may include one or more operations, functions or actions as illustrated by one or more of operations 402 to 422 numbered evenly. By way of non-limiting example, process 400 may be described herein with reference to example image processing devices 100 and 1300 of FIGS. 1 and 13 respectively, and where relevant.

Process 400 is provided to extract facial features which include setting the subset for each main landmark, and then determining a geometrical relationship for each of the subsets and to be used to form a descriptor as input to a model to determine the facial expression class label of the face. One way to accomplish this is by the following operations.

Process 400 then may include "obtain reference face shape data" 402. Since the reference face shape is a standard neutral face shape template, e.g., a mean neutral face shape over all neutral face shape samples, it is used to determine neighbor members for each main landmark.

Process 400 also may include "generate aligned shape data" 408, and by applying the reference data to the original face shape data as explained with operation 306 above.

Process 400 may include "set landmark count i=1" 406. This is the index for the landmark on a face where i=1 to N. If an image has multiple faces, each face would have its own set of N landmarks. As mentioned herein, by one example there may be N=68 landmarks for each face.

Thus, process 400 then may include "obtain 1 to K subset landmarks for main landmarks i" 408. By one form, the number K of landmarks to be placed in a subset may be any number that is one less than all of the landmarks on the face (1≤K≤N−1). In practice, K is determined by performing a statistical analysis of experimental results, e.g., on extended Cohn-Kanade (CK+) and Man-Machine Interaction (MMI) datasets, given a set of K={5, 10, 15, 20, 25, 30, 35, 40, . . . }, where the mean recognition accuracy curves were drawn according to experimental results from given K values. With these curves, the mean recognition accuracy variations due to different K values are determined, and the best K value may be selected.

By one approach, the closest K distances to the main landmark are selected for inclusion in each subset, such as K=10 or K=20. The distances may be measured by Euclidean distance. Thus, as mentioned herein, the subset may include the nearby neighbor landmarks, which may or may not indicate the same facial component as the main landmark of the subset. Alternatively, it will be appreciated that membership in the subsets may be determined by other methods such as setting a maximum distance or other thresholds, or may be limited by which facial component the landmark indicates. In addition, correlation values between a main landmark and other landmarks on a face shape computed by using image features such as color, texture, gradient, etc. can also be used to determine the main landmark's subset.

This operation also may include indexing both the main landmarks in a certain order from 1 to N, and the subset landmarks from 1 to K. By one form, the landmarks as main landmarks are ordered 1 to N and may be any logical order as long as the arrangement is maintained on all of the aligned face shapes generated from the same reference face shape with the original assignment of the landmark identification numbers in the first place. Thus, by one example, the numbers may generally run clockwise or counter clockwise around the face shape, or may be numbered by face component, and so forth. The index number becomes the permanent identification number for the landmark. As to subset landmarks, and as explained above, the order 1 to K may be set numerically from lowest to highest index number of the landmark. The resulting neighboring member indices for each main landmark are fixed and used on all aligned face shapes that use the same reference shape and for a current video sequence, by one example.

In many cases, every landmark on a face will be assigned its own subset of other landmarks. In some situations, less than all of the landmarks on a face may be used as a main landmark. The main landmarks may be limited to certain areas of a face, or to certain facial components on the face. For example, when the face shape is composed of a relatively large number of landmarks, and the chin also has one or more landmarks, the landmarks on the chin may be omitted. Specifically, the chin can be easily affected by background clutter or occluded due to face pose changes in practice. Also, the landmarks on the chin contribute less to facial muscle movements compared with other landmarks on key facial components such as eyes, eyebrows, nose and mouth. Thus, the landmarks on the chin may not be used as main landmarks in some cases but still may be included as other or neighbor landmarks within the subsets, or alternatively may not be used at all. Many variations are contemplated.

It also will be understood that when more than one subset is present, the subsets very well may overlap so that a single landmark may be included in multiple subsets. Similarly, the present process as discussed herein uses a landmark as a main landmark only once. Situations may exist, however, where a landmark may have multiple subsets with different members or landmark numbers in the subsets, or in other words, the landmark is a main landmark for a number of different additional or alternative subsets containing the same or different number of landmarks on the same face at a single time or frame. This might occur to provide extra weight to a certain landmark for example, or to test potential alternative subsets to determine a best subset for example.

Process 400 may then include "calculate geometrical relationship for subset" 410. Specifically, the aligned or normalized face shape values (fixed subset member indices, but different positions due to facial expression changes) are used to determine the geometrical relationships and form the DGRBFD descriptor for extraction and input into the offline learned discriminative facial expression model.

One purpose of the DGRBFD descriptor as mentioned before is to capture noticeable or minor or subtle facial expressions caused by variations in geometric features at landmarks located around primary facial components such as eyebrows, eyes, nose, mouth and chin, and caused by movement of facial muscles. It has also been found that such geometric variation at one specific facial landmark is closely related to those at least at its nearby neighbor landmarks if not all of the landmarks on the same face. Therefore, so called 1-to-K geometrical relationships to K other landmarks are potentially useful cues to discriminate the facial expression samples of one specific class from those of the other classes. As explained below, the process may use linear regression, by one example, to explicitly compute 1-to-K geometrical relationships within a whole face shape.

To calculate the geometrical relationship for each subset and corresponding main landmark, the following operations may be performed. Given a video sequence that includes a face, landmarks used to indicate the facial features on the face may have coordinates $(x_i, y_i)$, and where the coordinates may be of a pixel location on a frame (or image) for example. The following assumptions are made:

(a) let $S_m = \{x_i, y_i\}_{i=1 \ldots N}$ be the reference face shape used in the alignment step, where N is the number of landmarks forming the face shape, but may be considered as the number of main landmarks to be assigned a subset when less than all of the landmarks forming a face are to be main landmarks, (b) let $S_t \{x_i(t), y_i(t)\}_{i=1, \ldots, N}$ be the aligned face shape at time t such that t represents a single image or frame in a video sequence for example, (c) let $S_0 = \{x_i(0), y_i(0)\}_{i=1, \ldots, N}$ be the aligned onset face shape at time $t_0$, such that $S_0$ may be the first frame in a video sequence that shows the neutral face being analyzed, (d) let $P_i$ be an arbitrary landmark located at $(x_i, y_i)$, and referred to herein as the main landmark having a subset, (e) let $J_i = \{f(i)\}_{j=1, \ldots, K}$ be the respective subset having indices of K neighbors with nearest Euclidean distances to $P_i$ as mentioned above, and $1 \le K \le N-1$. A reference shape is used to compute $J_i$, and membership of other or neighbor landmarks in $J_i$ is maintained the same for use for $P_i$ in both aligned faces $S_t$ and $S_0$. Membership in K is as described above.

Now, for the aligned face shape $S_t$, the computation of the relationships between geometric features at landmark $P_i$ and those of its K neighbors is formulated as a linear regression (or linear representation) problem:

$$z_i(t) = A_i(t)\alpha_i(t) \tag{1}$$

where $$\begin{cases} z_i(t) = [\,x_i(t) \;\; y_i(t) \;\; 1\,]^T \\ \alpha_i(t) = [\,\alpha_{i1}(t) \;\; \alpha_{i2}(t) \;\; \ldots \;\; \alpha_{iK}(t)\,]^T \\ A_i(t) = \begin{bmatrix} x_{f_1(i)}(t) & x_{f_2(i)}(t) & \ldots & x_{f_K(i)}(t) \\ y_{f_1(i)}(t) & y_{f_2(i)}(t) & \ldots & y_{f_K(i)}(t) \\ 1 & 1 & \ldots & 1 \end{bmatrix} \end{cases} \tag{2}$$

where $f_1(i) \ldots f_K(i)$ refer to the indices of K neighbors of the main landmark $P_i$, and where $\alpha_{ik}(t) \in R$, and where $$\sum_{K=1}^{K} \alpha_{ik}(t) = 1 \tag{3}$$

The solution of the linear system of equations (1) can be solved by using a least-square estimator:

$$\bar{\alpha}_i(t) = (A_i(t)^T A_i(t))^{-1} A_i(t)^T z_i(t). \tag{4}$$

such that each $\bar{\alpha}_i(t)$ is a vector with K dimensionality (with an element for each neighbor landmark that is included in its subset). Thus, $\bar{\alpha}_i(t)$ is referred to as the geometrical relationship (or geometrical relationship vector) and each of its elements is referred to as a geometrical relationship value for clarity.

Also, each landmark i (1 to N) being analyzed has its own linear system (or linear regression) solution $\bar{\alpha}_i(t)$ otherwise referred to herein as the geometrical relationship for the main landmark (at $p_i$) and its subset (its K neighbors). Thus, the next operation in process 400 is to determine whether "i=Max N" 412, and if not, i is set to i+1 (414) to restart the loop at operation 404, and generate the geometrical relationship for the next main landmark and its subset. If N is reached, and all of the landmarks that are to be included as main landmarks have already been analyzed, the process 400 then proceeds to construct a single DGRBFD descriptor for the face.

Figures 6, 7:
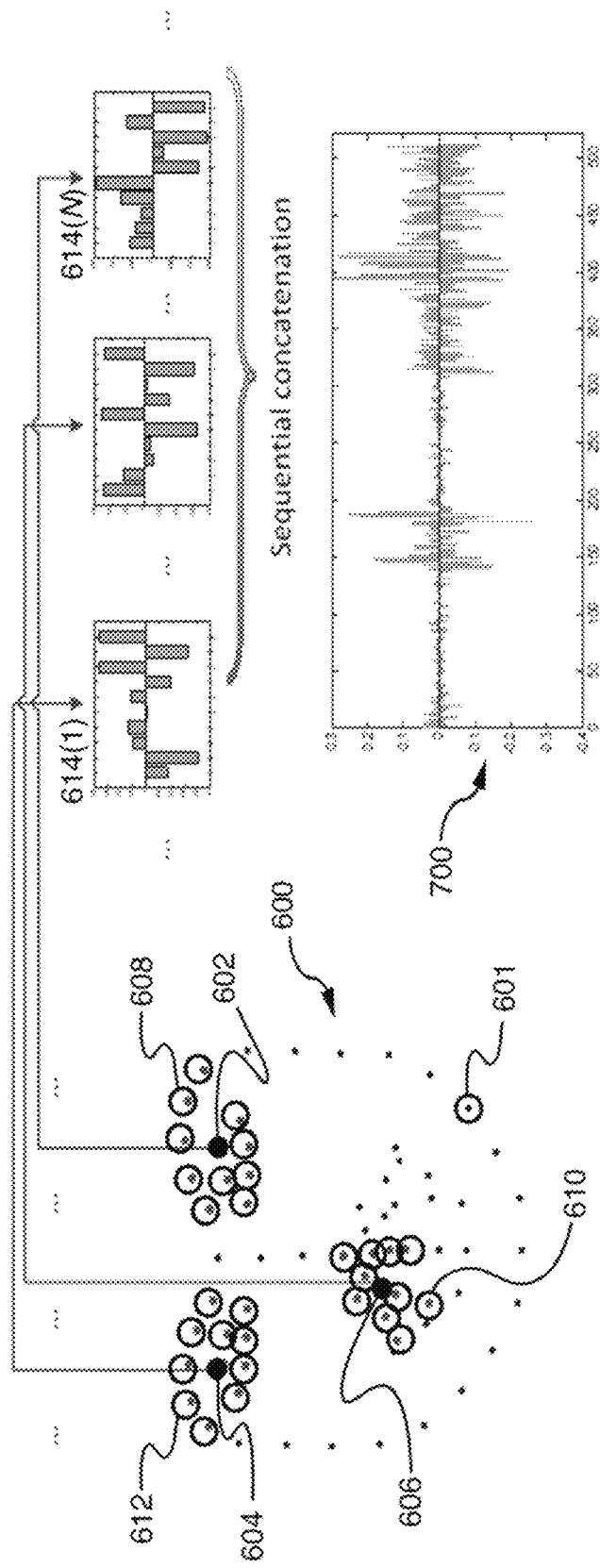
FIG. 6 is a diagram to explain feature extraction for facial expression recognition.
FIG. 7 is a chart to characterize a descriptor for feature extraction in a facial expression recognition process.

Referring to FIGS. 6-7, process 400 then may comprise "stack and concatenate geometrical relationships to form DGRBFD descriptor for the face" 416. For one example, a face shape 600 is shown with 68 landmarks 601, and where three of the main landmarks 602, 604, and 606 are each shown with a respective subset 608, 610, or 612 of other or neighbor landmarks. For this example, K=10 for 10 landmarks in each subset such that many landmarks are used in multiple subsets. The other subsets present are not shown. As a result, each main landmark has an extracted feature vector with a dimensionality of 10. Also, for this example, it is assumed that 17 of the 68 landmarks at the chin are not used as main landmarks, so that geometrical relationship values are formed for each of the main landmarks (51 in total) that are used. In the concatenation, each extracted feature vector is stacked to the tail of the previously stacked vector sequentially. Here, sequential refers to the numerical order in which the landmarks were indexed (1 to N) and (1 to K for each i) as explained above and originally at the reference face shape, and in the illustrated example, and the same order that the landmarks were used to generate the geometrical relationship in equations (1) to (4). The differences (equation (5)) in geometrical relationship values (or the elements of each geometric relationship vector) are maintained in the same sequence so that the geometric relationships from corresponding landmarks at different times are properly aligned to be compared to each other. So finally, continuing with the example, the DGRBFD feature descriptor may have a dimensionality of 51×10=510.

It will be understood that while the stacking and concatenation shown here uses the differences (T−T₀) of the geometrical relationship values (equation (5)), alternatively, the extracted geometrical relationship values can be used directly at a time T to form the descriptor instead. Here, the subtracted values, from time T₀, may be used to eliminate the baseline relationship so that the remaining relationship values (i.e., difference) are more discriminative and robust in describing the variation of the facial expressions.

As shown in FIG. 6, and continuing the example, a chart 614(1) to 614(N) is provided with one chart for each main landmark, and in turn each geometrical relationship $\bar{\alpha}_i(t)$. The x-axis denotes the indices of the landmarks (k) in the subset for landmark i, while the y-axis denotes the difference (equation (5)) in geometrical relationship value for each subset landmark from the solution vector (geometrical relationship) $\bar{\alpha}_i(t)$. The concatenation combines all of the geometrical relationships into a single chart 700 (FIG. 7) for 0 to 510 dimensions based on the indices of i and K (as shown along the x-axis, and where the y-axis is difference in geometrical relationship value).

Figure 8:
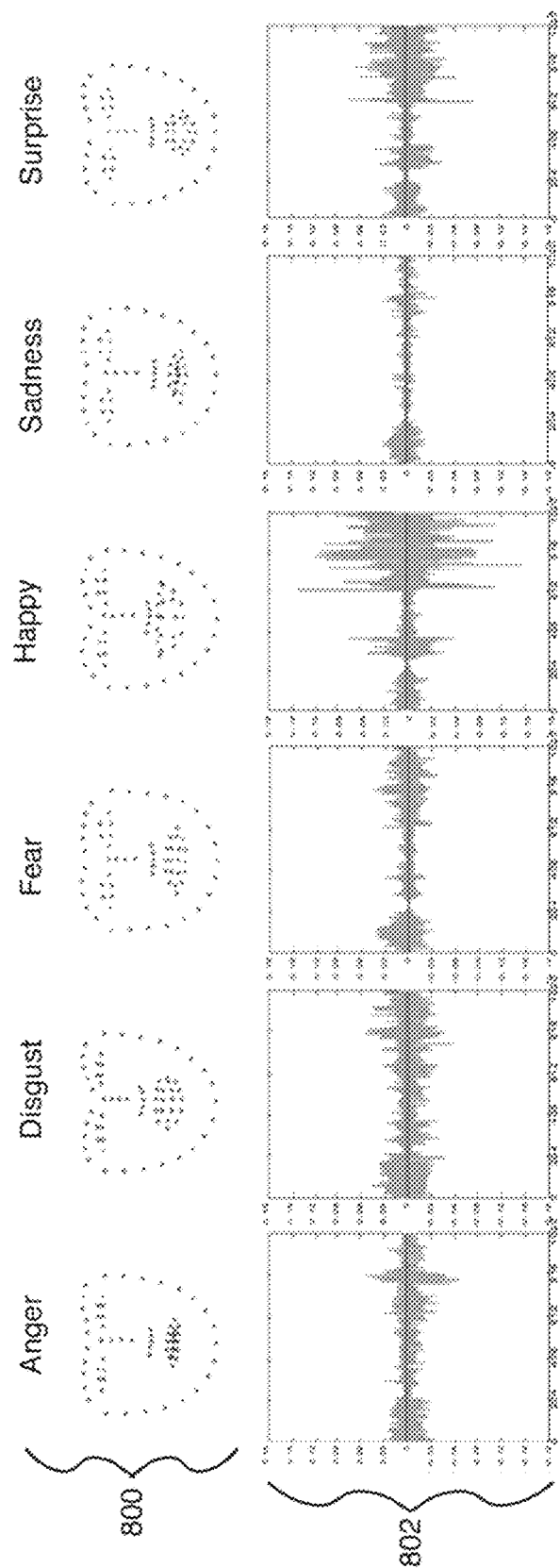
FIG. 8 is a set of charts of descriptors for feature extraction in a facial expression recognition.

Referring to FIG. 8, by another example, the DGRBFD has favorable capability in capturing diverse movements of facial muscles as demonstrated in charts 802 which present some representative DGRBFDs over aligned face shape samples 800 concerning six popular facial expression classes. On the charts 802, the x-axis denotes the indices of a neighbor subset of landmarks for a specific main landmark, and the y-axis denotes calculated differences (equation 5) in geometrical relationship values (where K=20). In the present system, the geometrical relationships<ᵢ between each of 51 landmarks (excluding 17 landmarks located on the chin as with the prior example) and a respective subset consisting of 20 nearest neighbors (selected from all 67 landmarks candidates) are used to construct DGRBFD. Thus, the DGRBFD used to describe each facial expression sample has a dimensionality of 51×20=1020 for this example.

By one form, however, the geometrical relationship itself is not the final value provided for the discriminative model. Instead, in order to factor in a temporal element to capture changes in facial expression over time, the descriptor includes differences in geometrical relationship for the same subset but at different times (or frames) as follows. The final descriptor to be used for matching the facial expression classification to the face, and therefore the input features to be placed into the discrimination label model, is found by the column vector:

$$\text{DGRBFD}\varphi_t = [(\bar{\alpha}_1(t)-\bar{\alpha}_1(0))^T (\alpha_2(t)-\alpha_2(0))^T \ldots (\bar{\alpha}_N(t)-\bar{\alpha}_N(0))^T]^T \quad (5)$$

and over the aligned face shape $S_t$ and $S_0$, and forming a vector for the descriptor. It will be understood that for the onset neutral descriptor $\varphi_0$, the actual geometrical relationship value is used in a zero vector. Otherwise, the descriptor is constructed by stacking and concatenating the solutions $\bar{\alpha}_i(t)$ of the linear systems of equations (1) to (4) concerning multiple or every facial main landmark and its K neighbors sequentially as explained herein. As shown in equation (5), the descriptor ultimately may include the differences for each main landmark between the solution in a current frame or time t and an initial or onset frame (t=0).

It will be appreciated that alternatives for the descriptor are contemplated that combine the geometrical relationships in other ways and for different kinds of models than that provided below.

Process 400 then may include "apply primary component analysis (PCA) to reduce the dimensionality of the descriptor" 418. According to experimental results, the 1020 dimensionality mentioned in the example above may be reduced to as low as 15 by using PCA. This forms the input for the discriminative LDCRF based dynamic model. PCA is a basic and popular method for dimensionality reduction. It is available in many popular open source SWs such as OpenCV and MATLAB. It will be understood that for large capacity systems PCA may be omitted.

Process 400 may include "recognize the class of the facial expression for the face using a discriminative facial expression model" 420. Specifically, a LDCRF based dynamic model may be used to categorize one or more images of the facial expression (DGRBFD) descriptors for dense areas on the images. The discriminative LDCRF based dynamic model handles continuous facial expression recognition problems while encoding intrinsic sub-structures of each facial expression category by associating a set of intermediate hidden states to each facial expression category, and encoding extrinsic transitions between different facial expression categories (from frame to frame for example) by modeling a number of training sequences of facial expression samples.

This modeling operation includes first training of the model, and second using the model with a current video sequence being analyzed to generate facial expression labels for the faces. Specifically, the discriminative model may be pre-trained, offline before the frames of the current video sequence is analyzed to provide a final facial expression class for further use. The discriminative model is trained by the same or similar procedures used for the training on CK+ and MMI datasets. Generally then, the training process may include detecting samples and aligning face shapes over a number of sample facial expression videos that may have a number of different subjects, may start from neutral and then show facial expressions in a number of different classes, and provide a range of motion for each facial expression such as showing specific target facial expression from onset to peak.

The training process may include the same or similar process as the actual application process (process 300 and 400) provided herein in order to optimize the parameters.

Once the parameters are set by the training, the parameters are fixed for the actual application to the current video sequence.

Referring to FIG. 9, the structure of a model 900 is shown where $x=\{x_1, x_2, \ldots x_T\}$ denotes DGRBFD based observations over time, $y=\{y_1, y_2, \ldots y_T\}$ denotes the related sequence of facial expression class labels, and $h=\{h_1, h_2, \ldots h_T\}$ denotes the intermediate hidden states. In other words, as descriptors $<p_t$ are formed, they are entered into the model so that the model includes multiple or all of the previous descriptors that have come before the current descriptor for the face being analyzed. Another way to say this is that each x in the model is a descriptor or a vector of DGRBFD so that $<p_t=x_T$ in the model. Also, the hidden state variables are incorporated in the model with an explicit partition. Thus, facial expression recognition can be performed over an arbitrary length of image frames of a test video sequence being used for the model building.

By one form, a descriptor is provided for the model for every frame throughout a running facial image for greatest accuracy. By other examples, however, the descriptor may be provided to the model in intervals (such as a descriptor for every 10th or 30th frame, and so forth) to reduce the computational load of the facial expression recognition.

With the above definitions, the model is defined as the probability equation (based on chain rule of probability):

$$P(y \mid x, \theta) = \sum_h P(y \mid h, x, \theta) P(h \mid x, \theta) \qquad (6)$$

where $\theta$ is the parameter of the model. To make training and inference tractable, the set of hidden states $H_{y_i}$ associated with each facial expression class label $y_i$ to be disjoint is restricted. That is, when any $h_i$ does not belong to $H_{y_i}$, then $P(y|h,x,8)=0$. Then, equation (6) can be expressed as:

$$P(y \mid x, \theta) = \sum_{h: \; \forall h_i \in H_{y_i}} P(h \mid x, \theta) \qquad (7)$$

P(h|x,8) is defined consistently with the formulation of the traditional conditional random fields (CRF), providing:

$$P(h \mid x, \theta) = \frac{1}{Z(x, \theta)} \exp \sum_k \theta_k \times F_k(h, x), \qquad (8)$$

where $$F_k(h, x) = \sum_{i=1}^{T} f_k(h_{i-1}, h_i, x, i). \qquad (9)$$

where $f_k(h_{i-1}, h_i, x, i)$ can be either a state function or a state transition function. A state function $s_k(h_i, x, i)$ for example represents the probability when the input feature vector x is classified as the hidden state $h_i$. A state transition function $t_k(h_{i-1}, h_i, x, i)$ represents the probability when the input feature vector x is classified as the hidden state $h_i$ under the condition that a previous feature vector is classified as the hidden state $h_{i-1}$. So, given input feature vector x, the state function only depends on a single current hidden state, while state transition function also depends on a previous hidden state $h_{i-1}$ in addition to current hidden state $h_i$. In the training process, gradient ascent algorithms are used to learn the optimized parameter values of the model by maximizing the log likelihood function of equation (6) over the whole training dataset.

Once a discriminative LDCRF based dynamic model is learned, facial expression labels over a testing video sequence can be easily inferred using sequential belief propagation. Specifically, from equations (6) and (7), the results of the LDCRF model are the parameter values $\theta$, the respective disjoint set of hidden states for each facial expression class, and the learned state functions or state transition functions. Given a testing input vector x, the respective facial expression label y* can be determined via maximizing the posterior probability model:

$$y^* = \underset{y}{\arg\max} P(y \mid x, \theta), \; i.e., \qquad (10)$$

$$y^* = \underset{y}{\arg\max} \sum_{h: \; \forall h \in h_y} P(h \mid x, \theta) \qquad (11)$$

Once a face is labeled with a facial expression category, the label may be provided to many different applications for use, such as for communicating with a game avatar, diagnosing the health, status, or needs of a person being monitored by camera, detecting a vehicle driver falling asleep, and so forth.

It will be understood that the model runs continuously over a video sequence such that the same model receives each of the descriptors for each frame with a face as the video sequence is being analyzed. As mentioned herein, this provides a cumulative, extrinsic-factored effect by collecting all of the descriptors into the model. Thus, once a descriptor is provided to the model, the operations are repeated for the next time frame (t) for the next descriptor to be generated and input to the model as explained with process 300 (FIG. 3).

Thus, the present method and system can accurately provide facial expression recognition. Moreover, the present method is able to perform facial expression recognition over multiple frames but also on a single frame. Also, it can run with a very fast speed (>50 fps) on conventional computers substantially regardless of the resolution of a video frame due to the fact that dense and discriminative facial features are directly extracted from the face shape. The size of the dynamic facial expression model is less than about 5 KB.

It will be appreciated that while the present process uses the seven or six facial expression classes addressed in CK+ and/or MMI datasets, the linear regression process can be easily generalized to handle more or less facial expression classes directly. The extended application scenarios can include sub-category facial expression recognition (such as slightly, normal, or extremely sub-categories for any of the basic facial expression classes such as happy), the combination of classes (such as sadness+contempt as one class), and many more facial expression variations (such as add left eye open or closed, right eye opened or closed, sleeping, and so forth). To handle such increased amount of facial expression classes, the system collects and carefully annotates related datasets for training shape models and dynamic facial expression models. The present method will obtain leading performance in these applications as well.

To test the disclosed face expression recognition methods against the state of the art, the results were compared to CK+ and MMI datasets that may be considered the most challenging publically available, well annotated, benchmark, facial expression datasets, and challenging in terms of the difficulties of establishing the facial expression samples as well as the number of facial expression classes.

The CK+ dataset contains 327 video sequences captured from 118 subjects 18 to 30 years old. All seven basic facial expressions including angry (Ang), contempt (Con), disgust (Dis), fear (Fea), happy (Hap), sadness (Sad), and surprise (Sur) are labeled. The labeled MMI dataset includes 205 video sequences captured from 23 subjects aged from 16 to 52 years. A total of six basic facial expressions (excluding contempt) are labeled. Unlike CK+ dataset, the subjects in MMI dataset usually show large head motions and non-posed facial expressions.

The comparative experiments and evaluation metrics were the same or similar to those described by Z. Wang, et al., Capturing complex spatio-temporal relations among facial muscles for facial expression recognition. *In Proceedings of 27th IEEE Conference on Computer Vision and Pattern Recognition*, pp. 3422-3429, 2013. The present experiments followed 15-folder and 20-folder cross-subject validation on all video sequences of CK+ and MMI datasets. Since the present method can perform facial expression recognition not only over multiple frames (including a whole video length) but also on single frame, the most difficult running manner, the single frame, was selected for comparison. In total, there are 5876 and 16633 image frames in CK+ dataset and MMI dataset, respectively. Table 1 below summarizes the results of the disclosed method and those disclosed by Z. Wang et al. It can be seen that the disclosed method reduces the error of the current state of the art by more than 63.94% and 23.97% on these two datasets, respectively. The tests confirmed that the model size of the dynamic facial expression (LDCRF) model is less than 5 KB, and the method runs with a very fast speed (>50 fps) on conventional computers sufficiently regardless of the resolution of video frame.

PERFORMANCE COMPARISON TABLE

| Method | Accuracy (on CK+) | Accuracy (on MMI) | FPS | Model size |
|---|---|---|---|---|
| Wang et al. | 86.3% | 59.7% | <10 | NA |
| Disclosed method | 95.06% | 69.36% | >50 | <5 KB |

Referring to FIGS. 10-11, confusion matrices 1000 and 1100 are provided to better show the improved performance of the disclosed method compared to the conventional methods. A confusion matrix is a standard way to show the performance of a method on multi-class recognition tasks. Two matrices are shown, a matrix 1000 for CK+ dataset and matrix 1100 for MMI dataset. On the confusion matrices, the y-axis denotes the actual (ground truth) class, and the x-axis includes all possible classes. Each row of the matrices provides the portions of the samples of a respective actual class that are recognized as each possible class. The sum of each row is 1, and the spaces at the diagonal of the matrix shows the true recognition rate (success), while the others spaces in the matrix show the error rates (failure portions recognized as other classes).

The presently disclosed method achieved a mean recognition rate of 95.06% over seven basic facial expressions (including angry, contempt, disgust, fear, happy, sadness and surprise) on popularly used CK+ dataset, reducing the error of the current state of the art by more than 63.94%. On a more challenging MMI dataset, the present method achieved a mean recognition rate of 69.36% over six basic facial expressions (MMI dataset does not contain contempt), reducing the error of the current state of the art by more than 23.97%.

Figure 12:
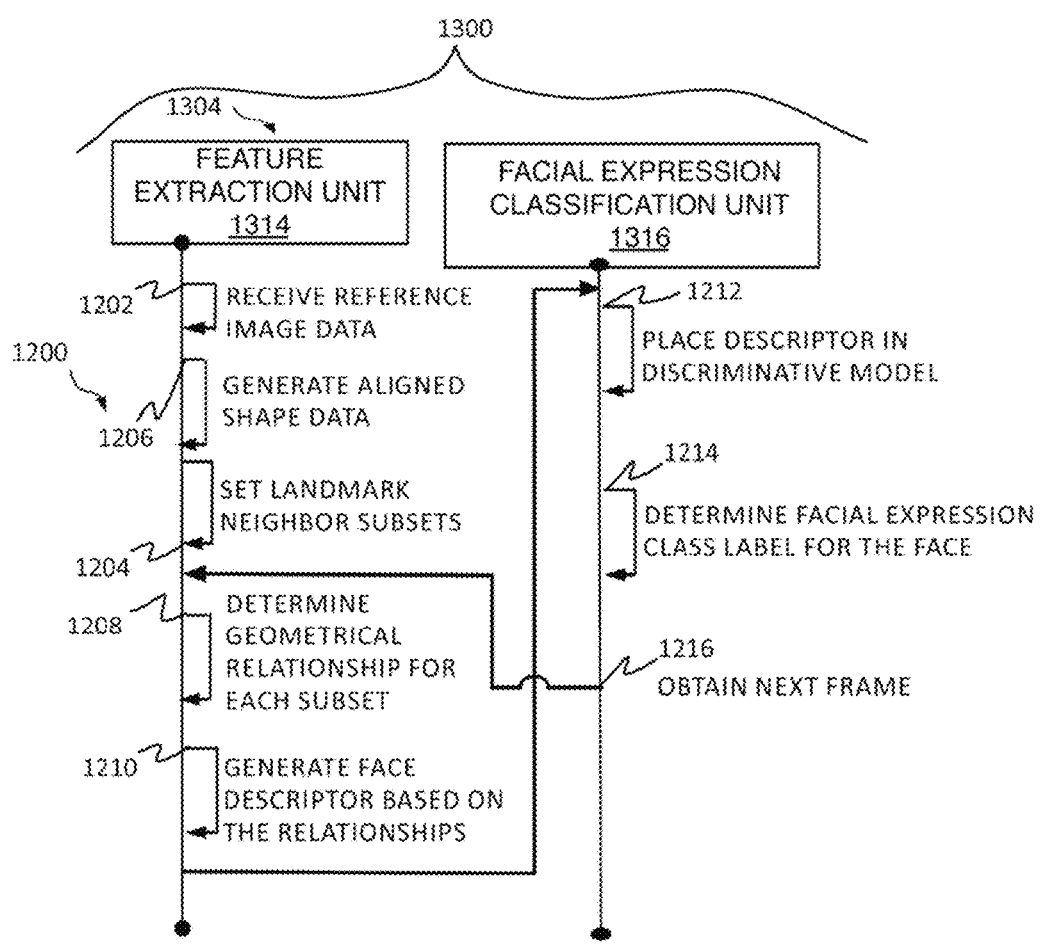
FIG. 12 is a diagram of an operation of an example system described herein.

Referring to FIG. 12, process 1200 illustrates the operation of a sample image processing system 1300 that performs facial expression recognition using geometrical relationships, such as linear relationships, within landmark subsets in accordance with at least some implementations of the present disclosure. In more detail, in the illustrated form, process 1200 may include one or more operations, functions or actions as illustrated by one or more of actions 1202 to 1216 numbered evenly. By way of non-limiting example, process 1200 will be described herein with reference to FIG. 13. Specifically, system 1300 includes logic units 1304 that has a facial expression recognition unit 1312 with a feature extraction unit 1314 and a facial expression classification unit 1316. The operation of the system may proceed as follows.

Process 1200 may include "receive reference shape data" 1202, and as explained above, which may be a neutral face shape with reference landmark coordinates that are averages from a set of training samples.

Process 1200 may include "generate aligned shape data" 1204. As explained above, the original shape data is aligned by using the reference shape data.

Process 1200 also may include "set landmark neighbor subsets" 1206 that uses the reference landmark coordinates to select which landmarks will be considered main landmarks and provides them a certain order in an index. This operation also includes determining the membership of other or neighbor landmarks in the subsets, and indexes them as well. As mentioned above, by one example, this may be a number of the closest landmarks relative to the main landmark that is included in the subset.

Process 1200 also may include "determine geometrical relationship for each subset" 1208. Particularly, by one example, a linear regression problem may be used and solved by a least squares method to determine the geometrical relationship for each subset. The solution or geometrical relationship itself may be a vector of geometrical relationship values, one value for each subset landmark.

The process 1200 may continue with "generate face descriptor based on the relationships" 1210. For this operation, the geometrical relationships for a face at a single point in time may be combined to form a single descriptor. The descriptor, by one example, is a vector of the geometrical relationships, and by another example is the DGRBFD descriptor. By one example, the geometrical relationships, and in turn the geometrical relationship values of the subset landmarks, are combined by stacking and concatenation in sequence. The descriptor then may be formed of the geometrical values or alternatively, differences between the geometrical values and corresponding geometrical values at an onset frame.

Process 1200 may include "place descriptor in discriminative model" 1212 so that as the descriptors are formed when a video sequence of images with a face is being analyzed, the descriptors are input to the label model so that the model includes a line of chronologically placed descriptors to factor in extrinsic changes in facial expression as the video sequence progresses. It will be understood that when an image has more than one face, a separate analysis and model is performed for each face.

Process 1200 may include "determine facial expression class label for the face" 1214. As described previously, a discriminative model may be used such as a CRF model or LDCRF model to accurately determine the most probable facial expression class for a particular face. A set of intermediate hidden states associated with facial expression classes along with maximized probability equations (10) and (11) may be used to determine the probable facial expression class label for a face at a particular time, or as the facial expression changes along the running of a video sequence. Also as mentioned, this operation may include first training the model on a training set to optimize the parameters of the model before applying the model to the descriptors of the current video sequence to be analyzed.

The process 1200 then may "obtain next frame" and loop back to perform descriptor generation (operation 1210). In other words, the model runs continuously for a video sequence cumulating the descriptors as mentioned above. The process is complete once the last frame (or other indicator) with a face is analyzed.

It will be appreciated that the processes 200, 300, 400, and 1200 respectively explained with FIGS. 2-4 and 12 do not necessarily have to be performed in the order shown, nor with all of the operations shown. It will be understood that some operations may be skipped or performed in different orders.

Also, any one or more of the operations of FIGS. 2-4 and 12 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
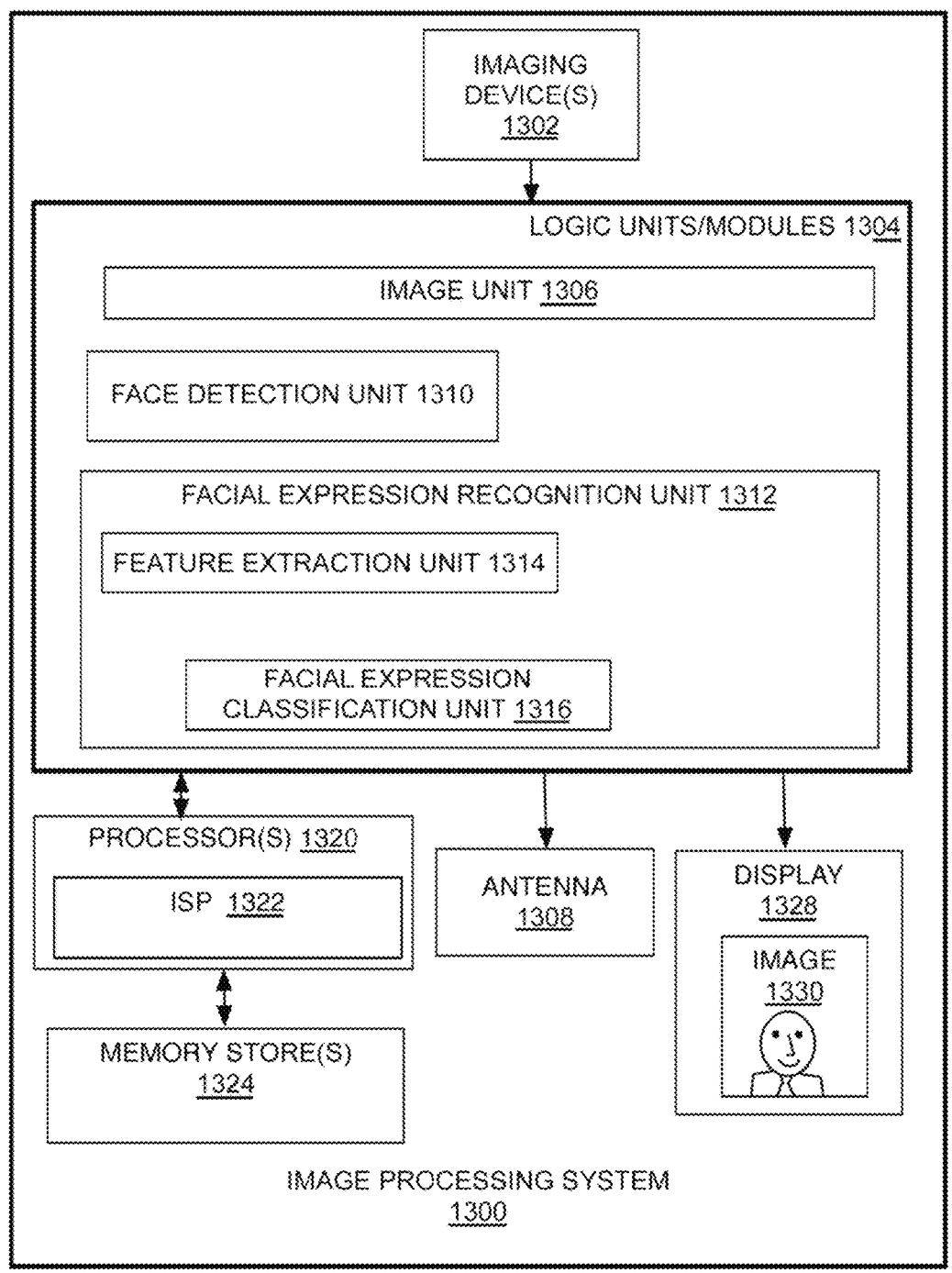
FIG. 13 is an illustrative diagram of an example system.

Referring to FIG. 13, an example image processing system 1300 is arranged in accordance with at least some implementations of the present disclosure. In various implementations, the example image processing system 1300 may have an imaging device 1302 to form or receive captured image data. This can be implemented in various ways. Thus, in one form, the image processing system 1300 may be a digital camera or other image capture device, and imaging device 1302, in this case, may be the camera hardware and camera sensor software, module, or component. In other examples, imaging processing system 1300 may have an imaging device 1302 that includes, or may be, a camera, and logic modules 1304 that may communicate remotely with, or otherwise may be communicatively coupled to, the imaging device 1302 for further processing of the image data.

In either case, such technology may include a camera such as a digital camera system, a dedicated camera device, web cam, or an imaging phone, whether a still picture or video camera or some combination of both. Thus, in one form, imaging device 1302 may include camera hardware and optics including one or more sensors as well as auto-focus, zoom, aperture, ND-filter, auto-exposure, flash, and actuator controls.

The logic modules 1304 of the image processing system 1300 may include, or communicate with, an image unit 1306 that performs at least partial processing. Thus, the image unit 1306 may perform pre-processing, encoding, and/or even post-processing to prepare the image data for transmission, storage, and/or display. The image unit 1306, at a minimum, has sufficient data to perform face detection and face expression recognition.

In the illustrated example, the logic modules 1304 also may include a face detection unit 1310, feature extraction unit 1314, and facial expression classification unit 1316 that perform many of the operations described above. These units may be operated by, or even entirely or partially located at, processor(s) 1320, and which may include an ISP 1322 to perform the operations. The logic modules may be communicatively coupled to the components of the imaging device 1302 in order to receive raw image data. In these cases, it is assumed the logic modules 1304 are considered to be separate from the imaging device. This need not be so, and the logic modules very well may be considered to be part of the imaging device as well.

The image processing system 1300 may have one or more processors 1320 which may include a dedicated image signal processor (ISP) 1322 such as the Intel Atom, memory stores 1324 which may or may not hold one or more of the facial detection and facial expression recognition databases mentioned above, and antenna 1308. In one example implementation, the image processing system 1300 may have a display 1328, at least one processor 1320 communicatively coupled to the display, and at least one memory 1324 communicatively coupled to the processor to perform the operations described herein as explained above. The image unit 1306, which may have an encoder, and antenna 1308 may be provided to compress the image date for transmission to other devices that may display or store the image. It will be understood that the image processing system 1300 may also include a decoder (or the image unit 1306 may include a decoder) to receive and decode image data for processing by the system 1300. Otherwise, the processed image 1330 may be displayed on display 1328 or stored in memory 1324. As illustrated, any of these components may be capable of communication with one another and/or communication with portions of logic modules 1304 and/or imaging device 1302. Thus, processors 1320 may be communicatively coupled to both the image device 1302 and the logic modules 1304 for operating those components. By one approach, although image processing system 1300, as shown in FIG. 13, may include one particular set of unit or actions associated with particular components or modules, these units or actions may be associated with different components or modules than the particular component or module illustrated here.

Figure 14:
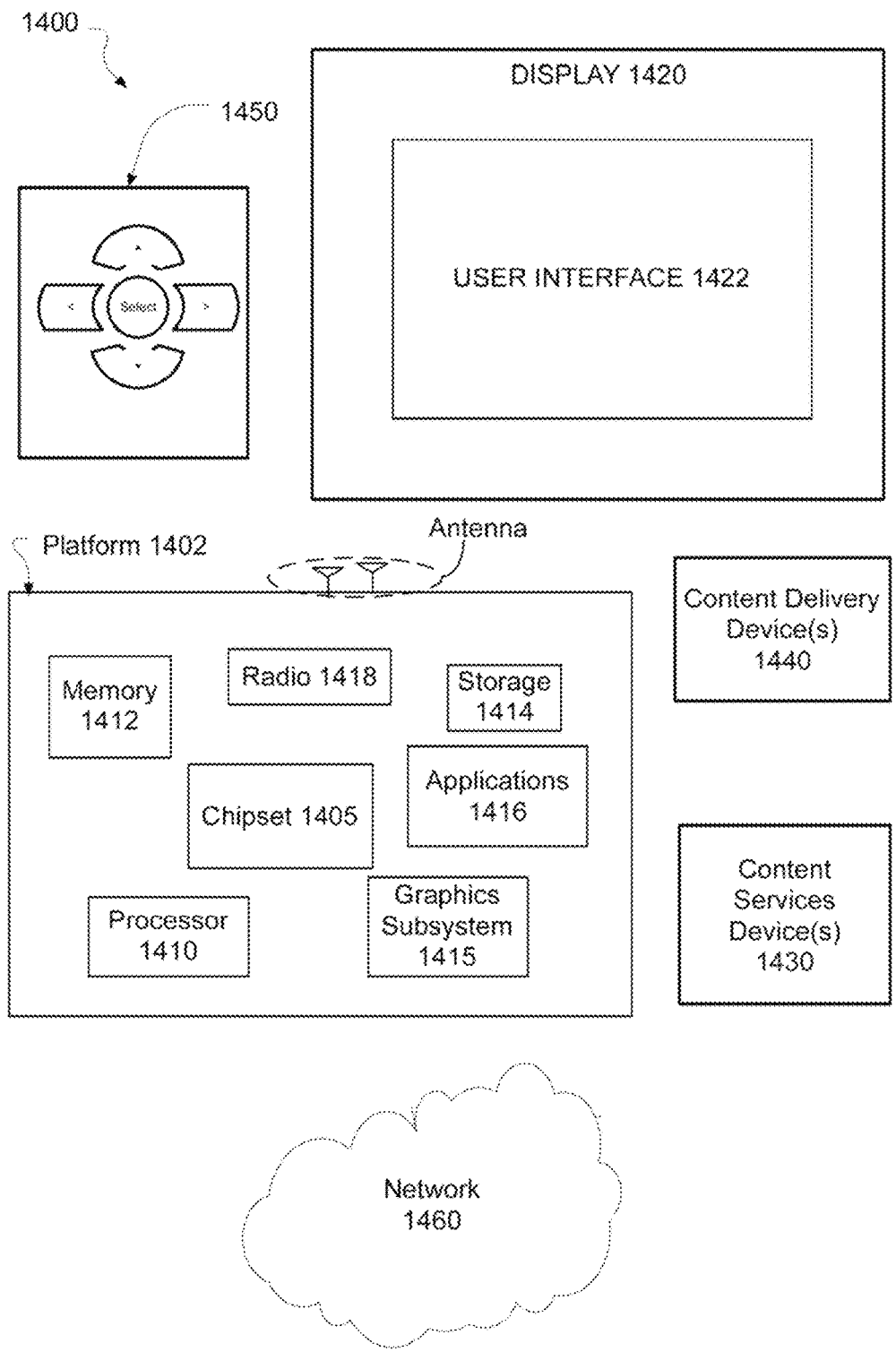
FIG. 14 is an illustrative diagram of another example system.

Referring to FIG. 14, an example system 1400 in accordance with the present disclosure operates one or more aspects of the image processing system described herein. It will be understood from the nature of the system components described below that such components may be associated with, or used to operate, certain part or parts of the image processing systems described above including performance of facial expression recognition related operations. In various implementations, system 1400 may be a media system although system 1400 is not limited to this context. For example, system 1400 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In implementations, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In implementations, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various implementations, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various implementations, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
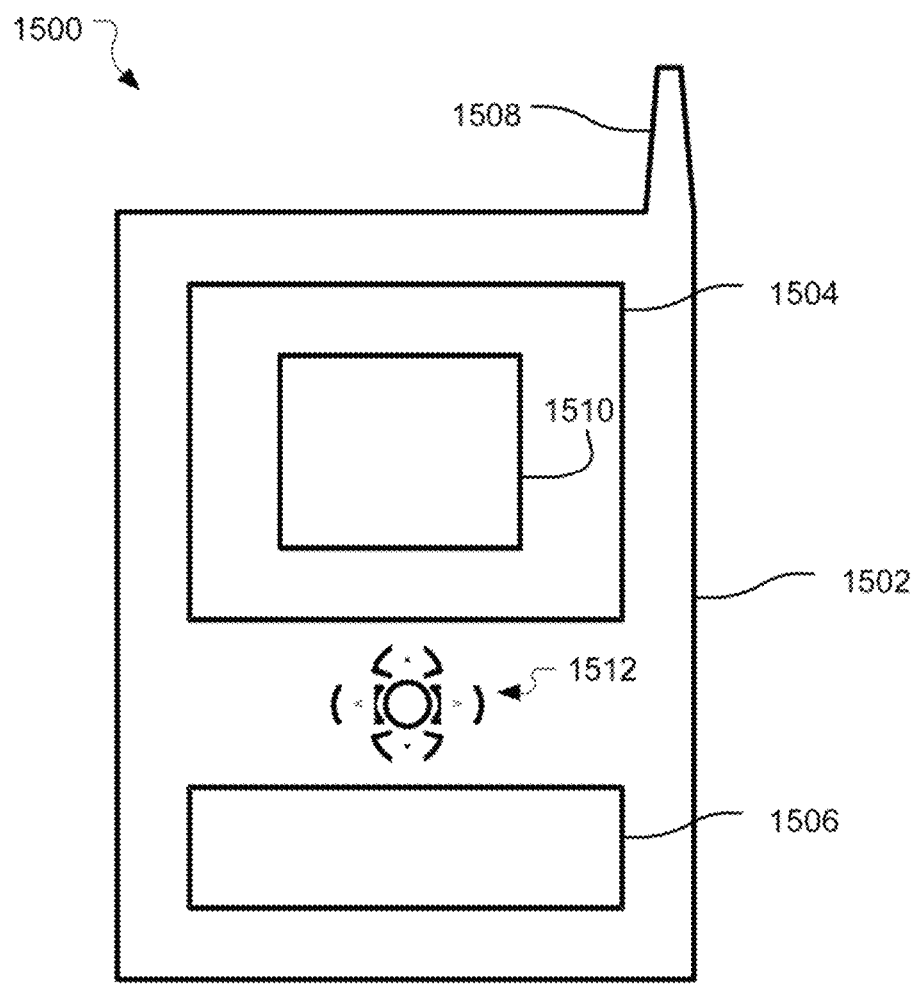
FIG. 15 illustrates another example device, all arranged in accordance with at least some implementations of the present disclosure.

Referring to FIG. 15, a small form factor device 1500 is one example of the varying physical styles or form factors in which system 1400 may be embodied. By this approach, device 1500 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 15, device 1500 may include a housing 1502, a display 1504 including a screen 1510, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, microphones, speakers, voice recognition device and software, and so forth. Information also may be entered into device 1500 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of facial expression recognition comprises obtaining image data of at least one image that comprises content having at least one person's face; and determining at least one subset of landmarks for at least one main landmark, where each landmark has data to indicate information about a facial feature of the face. The method also may comprise determining a relationship among the at least one main landmark and the subset of landmarks; and using a discriminative model to label a facial expression class for the face by using the relationship.

By another implementation, the method may include that the relationship is a geometrical relationship determined by using linear regression-type calculations, and the method may comprise forming a plurality of the subsets for a plurality of the main landmarks; determining the geometrical relationship for each of the subsets to form a group of the geometrical relationships; and using the group of geometrical relationships to form a descriptor to use to determine a facial expression classification of the face. Each of the main landmarks of the plurality of main landmarks has a single subset as a main landmark while being available to be in other subsets as a neighbor landmark; and wherein the subsets overlap so that at least one landmark is in more than one subset. The method also may comprise numbering the landmarks on the face to form an index, maintaining the numbering while forming the relationships, and stacking and concatenating the relationships in the same numerical sequence as the index number of the main landmark in order to form the descriptor; and wherein each geometrical relationship is a vector of geometrical relationship values wherein each value corresponds to a landmark in the subset. The method may comprise using the geometrical relationship values to form the descriptor by concatenating the geometrical relationship values in each subset in a numerical order according to the index numbers of the landmarks corresponding to the geometrical relationship values, and within the space in the descriptor reserved for the subset by the index number of the main landmark; and wherein the descriptor is a vector that includes values that are each a difference in geometrical relationship for a main landmark between the values of the landmarks in the subset on a current frame and a corresponding subset on an onset frame.

By other approaches, the method also comprises reducing the dimensionality of the descriptor by using primary component analysis (PCA) before using the descriptor in the model; and wherein at least one of: (1) multiple landmarks less than all landmarks of the face each have a subset of neighbor landmarks to use to determine the facial expression of the face; and (2) each landmark of the face has a subset of neighbor landmarks used in the calculations; and wherein at least one of: (a) a selected number of closest nearby neighbor landmarks relative to a main landmark are included in the subset of the main landmark, and (b) any landmark within a certain distance from the main landmark is included in the subset of the main landmark. Otherwise, the membership of landmarks in the subsets remains the same for the same face on multiple frames. The method may comprise tracking landmarks on the image data; normalizing the image data forming the face by using reference face shape data to form an aligned face shape; extracting features comprising: using the reference face shape data to determine the subsets, and using the aligned face shape to determine the relationships; and using a combination of the relationships in a discriminating label model to provide a face expression classification for the face. A plurality of differences between a current geometrical relationship and a corresponding geometrical relationship at a previous frame is placed into a latent dynamic continuous random field (LDCRF) model to match a facial expression classification to the face; and wherein the plurality of differences are combined into a current descriptor, and the LDCRF model determines a facial expression classification for the current face by factoring the current descriptor and at least one descriptor of a previous frame with the same face.

By yet another implementation, a computer-implemented system of facial expression recognition has a display, at least one processor communicatively coupled to the display, at least one memory communicatively coupled to at least one processor and storing image capture data of at least one frame of a video sequence or at least one still photograph; and at least one facial expression recognition unit communicatively coupled to the processor, and to: obtain image data of at least one image that comprises content having at least one person's face; and determine at least one subset of landmarks for at least one main landmark, wherein each landmark has data to indicate information about a facial feature of the face. The unit also may be provided to determine a relationship among the at least one main landmark and the subset of landmarks; and use a discriminative model to label a facial expression class for the face by using the relationship.

By another example, the system includes the relationship is a geometrical relationship determined by using linear regression-type calculations; and the facial expression recognition unit is provided to: form a plurality of the subsets for a plurality of the main landmarks; determine the geometrical relationship for each of the subsets to form a group of the geometrical relationships; and use the group of geometrical relationships to form a descriptor to use to determine a facial expression classification of the face. Each of the main landmarks of the plurality of main landmarks has a single subset as a main landmark while being available to be in other subsets as a neighbor landmark; wherein the subsets overlap so that at least one landmark is in more than one subset. The facial expression recognition unit to number the landmarks on the face to form an index, maintain the numbering while forming the relationships, and stack and concatenate the relationships in the same numerical sequence as the index number of the main landmark in order to form the descriptor. Also, each geometrical relationship is a vector of geometrical relationship values wherein each value corresponds to a landmark in the subset. The facial expression recognition unit to use the geometrical relationship values to form the descriptor by concatenating the geometrical relationship values in each subset in a numerical order according to the index numbers of the landmarks corresponding to the geometrical relationship values, and within the space in the descriptor reserved for the subset by the index number of the main landmark; and wherein the descriptor is a vector that includes values that are each a difference in geometrical relationship for a main landmark between the values of the landmarks in the subset on a current frame and a corresponding subset on an onset frame.

By other approaches, the system provides the facial expression recognition unit to reduce the dimensionality of the descriptor by using primary component analysis (PCA) before using the descriptor in the model; wherein at least one of: (1) multiple landmarks less than all landmarks of the face each have a subset of neighbor landmarks to use to determine the facial expression of the face; and (2) each landmark of the face has a subset of neighbor landmarks used in the calculations; and wherein at least one of: (a) a selected number of closest nearby neighbor landmarks relative to a main landmark are included in the subset of the main landmark, and (b) any landmark within a certain distance from the main landmark is included in the subset of the main landmark; wherein the membership of landmarks in the subsets remains the same for the same face on multiple frames. Also, the facial expression recognition unit to: track landmarks on the image data; normalize the image data forming the face by using reference face shape data to form an aligned face shape; extract features comprising: using the reference face shape data to determine the subsets, and using the aligned face shape to determine the relationships; and use a combination of the relationships in a discriminating label model to provide a face expression classification for the face. A plurality of differences between a current geometrical relationship and a corresponding geometrical relationship at a previous frame is placed into a latent dynamic continuous random field (LDCRF) model to match a facial expression classification to the face; and wherein the plurality of differences are combined into a current descriptor, and the LDCRF model determines a facial expression classification for the current face by factoring the current descriptor and at least one descriptor of a previous frame with the same face.

By one approach, at least one computer readable article comprises a plurality of instructions that in response to being executed on a computing device, cause the computing device to: obtain image data of at least one image that comprises content having at least one person's face; and determine at least one subset of landmarks for at least one main landmark, wherein each landmark has data to indicate information about a facial feature of the face. The computing device also may be caused to determine a relationship among the at least one main landmark and the subset of landmarks; and use a discriminative model to label a facial expression class for the face by using the relationship.

By another approach, the instructions include that the relationship is a geometrical relationship determined by using linear regression-type calculations; and the computing device is caused to: form a plurality of the subsets for a plurality of the main landmarks; determine the geometrical relationship for each of the subsets to form a group of the geometrical relationships; and use the group of geometrical relationships to form a descriptor to use to determine a facial expression classification of the face; wherein each of the main landmarks of the plurality of main landmarks has a single subset as a main landmark while being available to be in other subsets as a neighbor landmark; wherein the subsets overlap so that at least one landmark is in more than one subset; the computing device caused to number the landmarks on the face to form an index, maintain the numbering while forming the relationships, and stack and concatenate the relationships in the same numerical sequence as the index number of the main landmark in order to form the descriptor; and wherein each geometrical relationship is a vector of geometrical relationship values wherein each value corresponds to a landmark in the subset. The computing device being caused to use the geometrical relationship values to form the descriptor by concatenating the geometrical relationship values in each subset in a numerical order according to the index numbers of the landmarks corresponding to the geometrical relationship values, and within the space in the descriptor reserved for the subset by the index number of the main landmark; wherein the descriptor is a vector that includes values that are each a difference in geometrical relationship for a main landmark between the values of the landmarks in the subset on a current frame and a corresponding subset on an onset frame.

By other approaches, the instructions cause the computing device to reduce the dimensionality of the descriptor by using primary component analysis (PCA) before using the descriptor in the model; wherein at least one of: (1) multiple landmarks less than all landmarks of the face each have a subset of neighbor landmarks to use to determine the facial expression of the face; and (2) each landmark of the face has a subset of neighbor landmarks used in the calculations; wherein at least one of: (a) a selected number of closest nearby neighbor landmarks relative to a main landmark are included in the subset of the main landmark, and (b) any landmark within a certain distance from the main landmark is included in the subset of the main landmark; and wherein the membership of landmarks in the subsets remains the same for the same face on multiple frames. The computing device caused to: track landmarks on the image data; normalize the image data forming the face by using reference face shape data to form an aligned face shape; extract features comprising: using the reference face shape data to determine the subsets, and using the aligned face shape to determine the relationships; and use a combination of the relationships in a discriminating label model to provide a face expression classification for the face; wherein a plurality of differences between a current geometrical relationship and a corresponding geometrical relationship at a previous frame is placed into a latent dynamic continuous random field (LDCRF) model to match a facial expression classification to the face; and wherein the plurality of differences are combined into a current descriptor, and the LDCRF model determines a facial expression classification for the current face by factoring the current descriptor and at least one descriptor of a previous frame with the same face.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of facial expression recognition, comprising:
   obtaining image data of at least one image that comprises content having at least one person's face;
   determining at least one subset of landmarks for two or more main landmarks, wherein each landmark has data to indicate information about a facial feature of the face and wherein the subsets overlap so that one or more landmarks of the subset of landmarks is a main landmark with its own subset of landmarks;
   determining a relationship among each main landmark and its own subset of landmarks; and
   using a learned discriminative model to label a facial expression class for the face by using the relationships.

2. The method of claim 1 wherein the relationship is a geometrical relationship determined by using linear regression-type calculations.

3. The method of claim 1 comprising:
   forming a plurality of the subsets for a plurality of the main landmarks; and
   determining the geometrical relationship for each of the subsets to form a group of the geometrical relationships; and
   using the group of geometrical relationships to form a descriptor to use to determine a facial expression classification of the face.

4. The method of claim 3 wherein each of the main landmarks of the plurality of main landmarks has a single subset as a main landmark while being available to be in other subsets as a neighbor landmark.

5. The method of claim 3 wherein the subsets overlap so that at least one landmark is in more than one subset.

6. The method of claim 3 comprising numbering the landmarks on the face to form an index, maintaining the numbering while forming the relationships, and stacking and concatenating the relationships in the same numerical sequence as the index number of the main landmark in order to form the descriptor.

7. The method of claim 3 wherein each geometrical relationship is a vector of geometrical relationship values wherein each value corresponds to a landmark in the subset.

8. The method of claim 7 comprising using the geometrical relationship values to form the descriptor by concatenating the geometrical relationship values in each subset in a numerical order according to the index numbers of the landmarks corresponding to the geometrical relationship values, and within the space in the descriptor reserved for the subset by the index number of the main landmark.

9. The method of claim 3 wherein the descriptor is a vector that includes values that are each a difference in geometrical relationship for a main landmark between the values of the landmarks in the subset on a current frame and a corresponding subset on an onset frame.

10. The method of claim 3 comprising reducing the dimensionality of the descriptor by using primary component analysis (PCA) before using the descriptor in the model.

11. The method of claim 1 wherein multiple landmarks less than all landmarks of the face each have a subset of neighbor landmarks to use to determine the facial expression of the face.

12. The method of claim 1 wherein each landmark of the face has its own subset of neighbor landmarks used in the calculations.

13. The method of claim 1 wherein at least one of:
a selected number of closest nearby neighbor landmarks relative to a main landmark are included in the subset of the main landmark, and
any landmark within a certain distance from the main landmark is included in the subset of the main landmark.

14. The method of claim 1 wherein the membership of landmarks in the subsets remains the same for the same face on multiple frames.

15. The method of claim 1 comprising:
tracking landmarks on the image data;
normalizing the image data forming the face by using reference face shape data to form an aligned face shape;
extracting features comprising:
using the reference face shape data to determine the subsets, and
using the aligned face shape to determine the relationships; and
using a combination of the relationships in a discriminating label model to provide a face expression classification for the face.

16. The method of claim 1 wherein a plurality of differences between a current geometrical relationship and a corresponding geometrical relationship at a previous frame is placed into a latent dynamic continuous random field (LDCRF) model to match a facial expression classification to the face.

17. The method of claim 16 wherein the plurality of differences are combined into a current descriptor, and the LDCRF model determines a facial expression classification for the current face by factoring the current descriptor and at least one descriptor of a previous frame with the same face.

18. The method of claim 1 wherein the relationship is a geometrical relationship determined by using linear regression-type calculations;
the method comprising:
forming a plurality of the subsets for a plurality of the main landmarks;
determining the geometrical relationship for each of the subsets to form a group of the geometrical relationships; and
using the group of geometrical relationships to form a descriptor to use to determine a facial expression classification of the face;
wherein each of the main landmarks of the plurality of main landmarks has a single subset as a main landmark while being available to be in other subsets as a neighbor landmark;
wherein the subsets overlap so that at least one landmark is in more than one subset;
the method comprising numbering the landmarks on the face to form an index, maintaining the numbering while forming the relationships, and stacking and concatenating the relationships in the same numerical sequence as the index number of the main landmark in order to form the descriptor;
wherein each geometrical relationship is a vector of geometrical relationship values wherein each value corresponds to a landmark in the subset, the method comprising using the geometrical relationship values to form the descriptor by concatenating the geometrical relationship values in each subset in a numerical order according to the index numbers of the landmarks corresponding to the geometrical relationship values, and within the space in the descriptor reserved for the subset by the index number of the main landmark;
wherein the descriptor is a vector that includes values that are each a difference in geometrical relationship for a main landmark between the values of the landmarks in the subset on a current frame and a corresponding subset on an onset frame;
the method comprising reducing the dimensionality of the descriptor by using primary component analysis (PCA) before using the descriptor in the model;
wherein at least one of:
multiple landmarks less than all landmarks of the face each have a subset of neighbor landmarks to use to determine the facial expression of the face;
each landmark of the face has a subset of neighbor landmarks used in the calculations;
wherein at least one of:
a selected number of closest nearby neighbor landmarks relative to a main landmark are included in the subset of the main landmark, and
any landmark within a certain distance from the main landmark is included in the subset of the main landmark;
wherein the membership of landmarks in the subsets remains the same for the same face on multiple frames;
the method comprising:
tracking landmarks on the image data;
normalizing the image data forming the face by using reference face shape data to form an aligned face shape;
extracting features comprising:
using the reference face shape data to determine the subsets, and
using the aligned face shape to determine the relationships; and
using a combination of the relationships in a discriminating label model to provide a face expression classification for the face;
wherein a plurality of differences between a current geometrical relationship and a corresponding geometrical relationship at a previous frame is placed into a latent dynamic continuous random field (LDCRF) model to match a facial expression classification to the face; and wherein the plurality of differences are combined into a current descriptor, and the LDCRF model determines a facial expression classification for the current face by factoring the current descriptor and at least one descriptor of a previous frame with the same face.

19. A computer-implemented system of facial expression recognition comprising:
a display;
at least one processor communicatively coupled to the display;
at least one memory communicatively coupled to at least one processor and storing image capture data of at least one frame of a video sequence or at least one still photograph; and
at least one facial expression recognition unit communicatively coupled to the processor, and to:
obtain image data of at least one image that comprises content having at least one person's face;
determine at least one subset of landmarks for two or more main landmarks, wherein each landmark has data to indicate information about a facial feature of the face and wherein the subsets overlap so that one or more landmarks of the subset of landmarks is a main landmark with its own subset of landmarks;

determine a relationship among each main landmark and its own subset of landmarks; and use a learned discriminative model to label a facial expression class for the face by using the relationships.

20. The system of claim 19 wherein the relationship is a geometrical relationship determined by using linear regression-type calculations.

21. The system of claim 19, the facial expression recognition unit to:

form a plurality of the subsets for a plurality of the main landmarks; and determine the geometrical relationship for each of the subsets to form a group of the geometrical relationships; and use the group of geometrical relationships to form a descriptor to use to determine a facial expression classification of the face.

22. The system of claim 19 wherein the relationship is a geometrical relationship determined by using linear regression-type calculations;

the facial expression recognition unit to:

form a plurality of the subsets for a plurality of the main landmarks;

determine the geometrical relationship for each of the subsets to form a group of the geometrical relationships; and use the group of geometrical relationships to form a descriptor to use to determine a facial expression classification of the face;

wherein each of the main landmarks of the plurality of main landmarks has a single subset as a main landmark while being available to be in other subsets as a neighbor landmark;

wherein the subsets overlap so that at least one landmark is in more than one subset;

the facial expression recognition unit to number the landmarks on the face to form an index, maintain the numbering while forming the relationships, and stack and concatenate the relationships in the same numerical sequence as the index number of the main landmark in order to form the descriptor;

wherein each geometrical relationship is a vector of geometrical relationship values wherein each value corresponds to a landmark in the subset, the facial expression recognition unit to use the geometrical relationship values to form the descriptor by concatenating the geometrical relationship values in each subset in a numerical order according to the index numbers of the landmarks corresponding to the geometrical relationship values, and within the space in the descriptor reserved for the subset by the index number of the main landmark;

wherein the descriptor is a vector that includes values that are each a difference in geometrical relationship for a main landmark between the values of the landmarks in the subset on a current frame and a corresponding subset on an onset frame;

the facial expression recognition unit to reduce the dimensionality of the descriptor by using primary component analysis (PCA) before using the descriptor in the model;

wherein at least one of:

multiple landmarks less than all landmarks of the face each have a subset of neighbor landmarks to use to determine the facial expression of the face;

each landmark of the face has a subset of neighbor landmarks used in the calculations;

wherein at least one of:

a selected number of closest nearby neighbor landmarks relative to a main landmark are included in the subset of the main landmark, and any landmark within a certain distance from the main landmark is included in the subset of the main landmark;

wherein the membership of landmarks in the subsets remains the same for the same face on multiple frames;

the facial expression recognition unit to:

track landmarks on the image data;

normalize the image data forming the face by using reference face shape data to form an aligned face shape;

extract features comprising:

using the reference face shape data to determine the subsets, and using the aligned face shape to determine the relationships; and use a combination of the relationships in a discriminating label model to provide a face expression classification for the face;

wherein a plurality of differences between a current geometrical relationship and a corresponding geometrical relationship at a previous frame is placed into a latent dynamic continuous random field (LDCRF) model to match a facial expression classification to the face; and wherein the plurality of differences are combined into a current descriptor, and the LDCRF model determines a facial expression classification for the current face by factoring the current descriptor and at least one descriptor of a previous frame with the same face.

23. At least one non-transitory computer readable article comprising a plurality of instructions that in response to being executed on a computing device, causes the computing device to:

obtain image data of at least one image that comprises content having at least one person's face;

determine at least one subset of landmarks for two or more main landmarks, wherein each landmark has data to indicate information about a facial feature of the face and wherein the subsets overlap so that one or more landmarks of the subset of landmarks is a main landmark with its own subset of landmarks;

determine a relationship among each main landmark and its own subset of landmarks; and use a learned discriminative model to label a facial expression class for the face by using the relationships.

24. The article of claim 23 wherein the relationship is a geometrical relationship determined by using linear regression-type calculations; and the computing device caused to:

form a plurality of the subsets for a plurality of the main landmarks; and determine the geometrical relationship for each of the subsets to form a group of the geometrical relationships; and use the group of geometrical relationships to form a descriptor to use to determine a facial expression classification of the face.

25. The article of claim 23 wherein the relationship is a geometrical relationship determined by using linear regression-type calculations;
   the computing device caused to:
      form a plurality of the subsets for a plurality of the main landmarks;
      determine the geometrical relationship for each of the subsets to form a group of the geometrical relationships; and
      use the group of geometrical relationships to form a descriptor to use to determine a facial expression classification of the face;
   wherein each of the main landmarks of the plurality of main landmarks has a single subset as a main landmark while being available to be in other subsets as a neighbor landmark;
   wherein the subsets overlap so that at least one landmark is in more than one subset;
   the computing device caused to number the landmarks on the face to form an index, maintain the numbering while forming the relationships, and stack and concatenate the relationships in the same numerical sequence as the index number of the main landmark in order to form the descriptor;
   wherein each geometrical relationship is a vector of geometrical relationship values wherein each value corresponds to a landmark in the subset, the computing device caused to use the geometrical relationship values to form the descriptor by concatenating the geometrical relationship values in each subset in a numerical order according to the index numbers of the landmarks corresponding to the geometrical relationship values, and within the space in the descriptor reserved for the subset by the index number of the main landmark;
   wherein the descriptor is a vector that includes values that are each a difference in geometrical relationship for a main landmark between the values of the landmarks in the subset on a current frame and a corresponding subset on an onset frame;
   the computing device caused to reduce the dimensionality of the descriptor by using primary component analysis (PCA) before using the descriptor in the model;
   wherein at least one of:
      multiple landmarks less than all landmarks of the face each have a subset of neighbor landmarks to use to determine the facial expression of the face;
      each landmark of the face has a subset of neighbor landmarks used in the calculations;
   wherein at least one of:
      a selected number of closest nearby neighbor landmarks relative to a main landmark are included in the subset of the main landmark, and
      any landmark within a certain distance from the main landmark is included in the subset of the main landmark;
   wherein the membership of landmarks in the subsets remains the same for the same face on multiple frames;
   the computing device caused to:
      track landmarks on the image data;
      normalize the image data forming the face by using reference face shape data to form an aligned face shape;
      extract features comprising:
         using the reference face shape data to determine the subsets, and
         using the aligned face shape to determine the relationships; and
      use a combination of the relationships in a discriminating label model to provide a face expression classification for the face;
   wherein a plurality of differences between a current geometrical relationship and a corresponding geometrical relationship at a previous frame is placed into a latent dynamic continuous random field (LDCRF) model to match a facial expression classification to the face; and
   wherein the plurality of differences are combined into a current descriptor, and the LDCRF model determines a facial expression classification for the current face by factoring the current descriptor and at least one descriptor of a previous frame with the same face.

* * * * *